United States Patent
Narumi et al.

(10) Patent No.: US 7,376,058 B2
(45) Date of Patent: May 20, 2008

(54) OPTICAL INFORMATION RECORDING MEDIUM CONTAINING A PLURALITY OF RECORDING LAYERS PROVIDED WITH CHARACTERISTICS TO ACHIEVE OPTIMUM RECORDING CONDITIONS

(75) Inventors: Kenji Narumi, Osaka (JP); Kenichi Nishiuchi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 223 days.

(21) Appl. No.: 10/296,662

(22) PCT Filed: Sep. 12, 2001

(86) PCT No.: PCT/JP01/07927

§ 371 (c)(1),
(2), (4) Date: Mar. 31, 2003

(87) PCT Pub. No.: WO02/23542

PCT Pub. Date: Mar. 21, 2002

(65) Prior Publication Data

US 2003/0185121 A1  Oct. 2, 2003

(30) Foreign Application Priority Data

Sep. 13, 2000  (JP) ............................. 2000-277775

(51) Int. Cl.
*G11B 7/00* (2006.01)
(52) U.S. Cl. .................................. 369/47.53; 369/13.4
(58) Field of Classification Search ............ 369/47.53, 369/13.4
See application file for complete search history.

(56) References Cited

U.S. PATENT DOCUMENTS 6,190,750 B1 * 2/2001 Wierenga et al. .......... 428/64.1

(Continued)

FOREIGN PATENT DOCUMENTS

CN  2368131 Y  3/2000

(Continued)

OTHER PUBLICATIONS

English machine translation of Janpanese document of Tanaka, Toshihisa (JP 11-003550).*

(Continued)

*Primary Examiner*—Wayne Young
*Assistant Examiner*—Lixi Chow
(74) *Attorney, Agent, or Firm*—Renner, Otto, Boisselle & Sklar, LLP

(57) ABSTRACT

An optical information recording medium according to the present invention includes a first information recording layer on which information is to be recorded by laser light; and a second information recording layer on which information is to be recorded by the laser light which has passed through the first information recording layer. The first information recording layer includes at least one of a reproduction-only area and a recording and reproduction area. The second information recording layer includes a test recording area. At least one of the reproduction-only area and the recording and reproduction area, and the test recording area is located such that one of the reproduction-only area and the recording and reproduction area includes an area of the first information recording layer through which the laser light for recording information in the test recording area passes.

1 Claim, 14 Drawing Sheets

U.S. PATENT DOCUMENTS 6,795,389 B1 * 9/2004 Nishiuchi et al. ........ 369/275.3
6,850,469 B2 * 2/2005 Ogawa et al. ........... 369/47.22

FOREIGN PATENT DOCUMENTS

| EP | 0 841 658 A2 | 5/1998 |
|---|---|---|
| JP | 03-157816 | 7/1991 |
| JP | 09-180248 | 7/1997 |
| JP | 11-003550 | 1/1999 |

OTHER PUBLICATIONS

Chinese Office Action for corresponding Application 01814327.X dated Jul. 4, 2004.

* cited by examiner

OPTICAL INFORMATION RECORDING MEDIUM CONTAINING A PLURALITY OF RECORDING LAYERS PROVIDED WITH CHARACTERISTICS TO ACHIEVE OPTIMUM RECORDING CONDITIONS

TECHNICAL FIELD

The present invention relates to an optical information recording medium, an optical information recording method and an optical information recording apparatus, for optically recording information. In more detail, the present invention relates to an optical information recording medium including a first information recording layer on which information is to be recorded by laser light and a second information recording layer on which information is to be recorded by the laser light which has passed through the first information recording layer; and a method and an apparatus for the optical information recording medium.

BACKGROUND ART

Recently, optical discs, optical cards, optical tapes and the like have been developed as optical information recording media for allowing information to be optically recorded. Among these, optical discs have attracted attention as optical information recording media for allowing a large capacity of information to be recorded at high density.

One type of rewritable discs are phase-change optical discs. A recording layer used for a phase-change optical disc is reversibly changed to either an amorphous state or a crystalline state, depending on the conditions of heating by laser light and the cooling conditions. The recording layer has different optical constants when in an amorphous state from when in a crystalline state. Therefore, in the case of a phase-change disc, one of the two states is selectively formed in the recording layer in accordance with information to be recorded, and the resultant optical change (i.e., a change in transmittance or reflectance) is utilized. Thus, information recording and/or reproduction can be performed. In order to obtain the two states, information is recorded as follows.

A recording layer of an optical disc is irradiated with pulse-type laser light (referred to as a "recording pulse") at a power for raising the temperature of the recording layer to equal to or higher than the melting point. As the laser light passes, the melted portion of the recording layer is rapidly cooled into a recording mark in an amorphous state. Alternatively, the recording layer is irradiated with focused laser light at a power for raising the temperature of the recording layer to a point equal to or higher than the crystallization point but equal to or lower than the melting point. Then, the portion of the recording layer irradiated with the laser light is placed into a crystalline state.

An optical disc is a recording medium which is exchangeably mounted with other optical discs on an optical disc recording and reproduction apparatus. Therefore, the optical disc recording and reproduction apparatus needs to stably perform recording on or reproduction from a plurality of optical discs. Even optical discs produced under the same conditions may have different recording mark states or may be differently influenced by thermal interference between recording marks, due to different thermal characteristics thereof which are caused by dispersions at the time of production and/or time-wise changes. This may result in different recording conditions including the recording power for the optical disc and the optimum edge position of the recording pulse.

In order to stably record information without being influenced by changes in such recording conditions, an optical disc recording and reproduction apparatus obtains recording conditions before recording information on an optical disc. Specifically, before recording information on an optical disc, an optical recording and reproduction apparatus performs test recording using a specific data pattern (referred to as "test information"), reproduces the test information, and measures the reproduced signal so as to obtain the recording condition. This process is referred to as "test recording". Optical discs have an area used by the test recording, which is referred to as an "test recording area".

A rewritable disc has a reproduction-only area pre-formed in a specific portion. The reproduction-only area includes convex and concave phase pits. In the reproduction-only area, information which does not need to be rewritten, for example, information on the optical disc itself or address information, is recorded. This area is also referred to as an "emboss area".

An area in which information is recorded by forming a recording mark is referred to as a "recording and reproduction area". In the recording and reproduction area, information which has a possibility of being rewritten is recorded.

A general rewritable optical disc has a data area in a central portion in a radial direction thereof, and has a lead-in area in a portion internal with respect to the data area, and a lead-out area in a portion external with respect to the data area. In general, an area for recording management information of the optical disc and/or a test recording area is provided in the lead-in area and the lead-out area.

Recently, there has been strong demand for the optical discs with a higher recording density. In response to this demand, a multi-layer recording medium having two or more information recording layers in a thickness direction of the disc is proposed. Information can be recorded on each of the information recording layers.

In such a multi-layer recording medium, each of the information recording layers often have different recording characteristics. This requires test recording to be performed for each information recording layer. One exemplary method of such test recording is disclosed in Japanese Laid-Open Publication No. 11-3550.

However, conventional methods do not consider the following phenomenon. When test recording is performed on an information recording layer of a multi-layer recording medium which is far from the laser incidence surface (the information recording layer far from the laser incidence surface will be referred to as a "second information recording layer"), the second information recording layer is influenced by the state of an information recording layer which is closer to the laser incidence surface (the information recording layer closer to the laser incidence surface will be referred to as a "first information recording layer").

Laser light used for recording information on the second information recording layer may become non-uniform when the laser light has passed through a certain area of the first information recording layer. In this case, test recording would not provide accurate recording conditions.

The light transmittance of an information recording layer varies depending on whether information is recorded or not in the recording and reproduction area of the information recording layer. Therefore, the amount of laser light reaching the second information recording layer varies in accordance with the ratio of an unrecorded area and a recorded area in a light spot of the laser light on the first information recording layer, the light spot being formed before the laser light is used for test recording on the second information recording layer. As a result, accurate recording conditions are not obtained.

The light transmittance of an unrecorded area in the recording and reproduction area can be considered to be equal to the light transmittance of the reproduction-only area. However, the light transmittance of a recorded area in the recording and reproduction area is different from the light transmittance of the reproduction-only area. Accordingly, when test recording is performed on the second information recording layer, the amount of laser light reaching the second information recording layer varies also in accordance with the ratio of the reproduction-only area and the recording and reproduction area in a light spot on the first information recording layer (and the ratio of the recorded area and the unrecorded area in the recording and reproduction area).

The second information recording layer is influenced by the state of the first information recording layer when information (for example, user data information) is recorded in a recording and reproduction area of the second information recording layer, as well as at the time of test recording. In this case also, information cannot be accurately recorded, which reduces the signal quality used for reproducing the recorded information.

The present invention, to solve these problems of the prior art, has an objective of accurately obtaining optimum recording conditions for an optical information recording medium having two or more information recording layers, and another objective of accurately recording information on each of two or more information recording layers of an optical information recording medium.

DISCLOSURE OF THE INVENTION

An optical information recording medium according to the present invention includes a first information recording layer on which information is to be recorded by laser light; and a second information recording layer on which information is to be recorded by the laser light which has passed through the first information recording layer. The first information recording layer includes at least one of a reproduction-only area and a recording and reproduction area. The second information recording layer includes a test recording area. At least one of the reproduction-only area and the recording and reproduction area, and the test recording area is located such that one of the reproduction-only area and the recording and reproduction area includes an area of the first information recording layer through which the laser light for recording information in the test recording area passes.

The optical information recording medium may further include a separation layer for separating the first information recording layer and the second information recording layer from each other. The area of the first information recording layer, through which the laser light for recording information in the test recording area passes, may extend outward from an outer end of an area of the first information recording layer corresponding to the test recording area by a length $\delta$, the length $\delta$ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the test recording area.

The second information recording layer may have a data recording area which extends from an end of the test recording area by at least the length $\delta$.

The area of the first information recording layer, through which the laser light for recording information in the test recording area passes, may extend outward from the outer end of the area of the first information recording layer corresponding to the test recording area by a length $\delta'$, the length $\delta'$ being represented by:

$$\delta' = d \cdot \tan(\sin^{-1}(NA/n)) + \delta m$$

where $\delta m$ is a maximum positional offset distance between the first information recording layer and the second information recording layer.

The second information recording layer may include a data recording area which extends from the end of the test recording area by at least the length $\delta'$.

An optical information recording medium according to the present invention includes a first information recording layer on which information is to be recorded by laser light; and a second information recording layer on which information is to be recorded by the laser light which has passed through the first information recording layer. The first information recording layer includes a prescribed area. The second information recording layer includes a test recording area. The prescribed area and the test recording area are located such that the prescribed area includes an area of the first information recording layer through which the laser light for recording information in the test recording area passes. The prescribed area is entirely in a recorded state or entirely in an unrecorded state.

The prescribed area, when being in an unrecorded state, may be a recording prohibited area.

The prescribed area, when being in an unrecorded state, may be a mirror area.

The prescribed area, when being in an unrecorded state, may be a lead-in area.

The optical information recording medium may further include a separation layer for separating the first information recording layer and the second information recording layer from each other. The area of the first information recording layer, through which the laser light for recording information in the test recording area passes, may extend outward from an outer end of an area of the first information recording layer corresponding to the test recording area by a length $\delta$, the length $\delta$ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the test recording area.

The second information recording layer may have a data recording area which extends from an end of the test recording area by at least the length $\delta$.

The area of the first information recording layer, through which the laser light for recording information in the test recording area passes, may extend outward from the outer end of the area of the first information recording layer corresponding to the test recording area by a length $\delta'$, the length $\delta'$ being represented by:

$$\delta' = d \cdot \tan(\sin^{-1}(NA/n)) + \delta m$$

where δm is a maximum positional offset distance between the first information recording layer and the second information recording layer.

The second information recording layer may include a data recording area which extends from the end of the test recording area by at least the length δ'.

An optical information recording medium according to the present invention includes a first information recording layer on which information is to be recorded by laser light; and a second information recording layer on which information is to be recorded by the laser light which has passed through the first information recording layer. The first information recording layer includes a test recording area and a recording and reproduction area. A light transmittance of an area of the first information recording layer, through which the laser light for recording information in the test recording area passes, is different from a light transmittance of an area of the first information recording layer, through which the laser light for recording information in the recording and reproduction area passes. Information for calculating an optimum recording condition of at least one of the test recording area and the recording and reproduction area is recorded in a specific area of either the first information recording layer or the second information recording layer.

An optical information recording medium according to the present invention includes a first information recording layer on which information is to be recorded by laser light; and a second information recording layer on which information is to be recorded by the laser light which has passed through the first information recording layer. The first information recording layer includes at least one of a reproduction-only area and a first recording and reproduction area. The second information recording layer includes a second recording and reproduction area. At least one of the reproduction-only area and the first recording and reproduction area, and the second recording and reproduction area are located such that one of the reproduction-only area and the first recording and reproduction area includes an area of the first information recording layer through which the laser light for recording information in the second recording and reproduction area passes.

The optical information recording medium may further include a separation layer for separating the first information recording layer and the second information recording layer from each other. The area of the first information recording layer, through which the laser light for recording information in the second recording and reproduction area passes, may extend outward from an outer end of an area of the first information recording layer corresponding to the second recording and reproduction area by a length δ, the length δ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the second recording and reproduction area.

The area of the first information recording layer, through which the laser light for recording information in the second recording and reproduction area passes, may extend outward from the outer end of the area of the first information recording layer corresponding to the second recording and reproduction area by a length δ', the length δ' being represented by:

$$\delta' = d \cdot \tan(\sin^{-1}(NA/n)) + \delta m$$

where δm is a maximum positional offset distance between the first information recording layer and the second information recording layer.

A size of the reproduction-only area of the first information recording layer may be zero.

An optical information recording medium according to the present invention includes a first information recording layer on which information is to be recorded by laser light; a second information recording layer on which information is to be recorded by the laser light which has passed through the first information recording layer; and a separation layer for separating the first information recording layer and the second information recording layer from each other. The first information recording layer includes at a first test recording area and a non-uniform light prevention area. The second information recording layer includes a second test recording area. The non-uniform light prevention area, the first test recording area and the second test recording area are located, such that a distance between the first test recording area and the second test recording area is greater than a length δ, and such that the non-uniform light prevention area includes an area of the first information recording layer through which the laser light for recording information in the second test recording area passes, the length δ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the second test recording area.

The first information recording layer may include at least one of a first lead-in area and a first lead-out area. The second information recording layer may include at least one of a second lead-in area and a second lead-out area. The first lead-in area and the second lead-in area respectively may include the first test recording area and the second test recording area, or the first lead-out area and the second lead-out area respectively include the first test recording area and the second test recording area.

The non-uniform light prevention area of the first information recording layer may be a reproduction-only area.

The non-uniform light prevention area may be an area formed of at least one of the group consisting of a reproduction-only area, a recording prohibited area, and a mirror area.

The area of the first information recording layer, through which the laser light for recording information in the second test recording area passes, may extend outward from an outer end of an area of the first information recording layer corresponding to the second test recording area by a length δ', the length δ' being represented by:

$$\delta' = d \cdot \tan(\sin^{-1}(NA/n)) + \delta m$$

where δm is a maximum positional offset distance between the first information recording layer and the second information recording layer.

The area of the first information recording layer, through which the laser light for recording information in the second test recording area passes, may extend outward from an outer end of an area of the first information recording layer corresponding to the second test recording area by a length δ', the length δ' being represented by:

$$\delta' = d \cdot \tan(\sin^{-1}(NA/n)) + \delta m$$

where δm is a maximum positional offset distance between the first information recording layer and the second information recording layer.

An optical information recording method according to the present invention is for an optical information recording medium including a first information recording layer on which information is to be recorded by laser light; and a second information recording layer on which information is to be recorded by the laser light which has passed through the first information recording layer. The first information recording layer includes at least one of a reproduction-only area and a recording and reproduction area. The second information recording layer includes a test recording area. The optical information recording method includes the steps of recording information, in advance, in an area of the first information recording layer, through which the laser light for recording information in the test recording area is to pass; and recording the information in the test recording area after the step of recording the information in advance.

The optical information recording method may further include a separation layer for separating the first information recording layer and the second information recording layer from each other. The area of the first information recording layer, through which the laser light for recording information in the test recording area passes, may extend outward from an outer end of an area of the first information recording layer corresponding to the test recording area by a length δ, the length δ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the test recording area.

The area of the first information recording layer, through which the laser light for recording information in the test recording area passes, may extend outward from the outer end of the area of the first information recording layer corresponding to the test recording area by a length δ', the length δ' being represented by:

$$\delta' = d \cdot \tan(\sin^{-1}(NA/n)) + \delta m$$

where δm is a maximum positional offset distance between the first information recording layer and the second information recording layer.

The information which is recorded in advance may be information obtained by modulating dummy information.

The step of recording the information in advance may include the step of recording using a certification step.

An optical information recording method according to the present invention is for an optical information recording medium including a first information recording layer on which information is to be recorded by laser light; and a second information recording layer on which information is to be recorded by the laser light which has passed through the first information recording layer. The first information recording layer includes at least one of a reproduction-only area and a recording and reproduction area. The second information recording layer includes a test recording area. The optical information recording method includes the steps of determining whether an area of the first information recording layer, through which the laser light for recording information in the test recording area passes, is an area of one of the reproduction-only area and the recording and reproduction area which is an unrecorded state or an area of the recording and reproduction area which is in a recorded state; executing test recording in the test recording area so as to obtain a recording condition; and calculating an optimum recording condition for the second information recording layer based on the result of the determination and the obtained recording condition.

The optical information recording medium may further include a separation layer for separating the first information recording layer and the second information recording layer from each other. The area of the first information recording layer, through which the laser light for recording information in the test recording area passes, may extend outward from an outer end of an area of the first information recording layer corresponding to the test recording area by a length δ, the length δ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the second recording and reproduction area.

The area of the first information recording layer, through which the laser light for recording information in the test recording area passes, may extend outward from the outer end of the area of the first information recording layer corresponding to the test recording area by a length δ', the length δ' being represented by:

$$\delta' = d \cdot \tan(\sin^{-1}(NA/n)) + \delta m$$

where δm is a maximum positional offset distance between the first information recording layer and the second information recording layer.

The information for calculating the optimum recording condition may be recorded in a specific area of the first information recording layer and the second information recording layer.

An optical information recording apparatus according to the present invention is for an optical information recording medium including a first information recording layer on which information is to be recorded by laser light; and a second information recording layer on which information is to be recorded by the laser light which has passed through the first information recording layer. The second information recording layer includes a test recording area. The optical information recording apparatus includes an interference area determination section for determining an area of the first information recording layer through which the laser light for recording information in the test recording area passes; a recorded/unrecorded state determination section for determining whether the area of the first information recording layer, through which the laser light for recording information in the test recording area passes, is in a recorded state or in an Unrecorded state; and a recording section for recording a signal in the area of the first information recording layer, through which the laser light for recording information in the test recording area passes, based on the results of the determination of the interference area determination section and the recorded/unrecorded state determination section.

BEST MODE FOR CARRYING OUT THE INVENTION

Hereinafter, the present invention will be described by way of illustrative examples with reference to attached drawings.

EXAMPLE 1

This example relates to an optical information recording medium with which accurate recording conditions can be obtained by the test recording.

Figure 1:
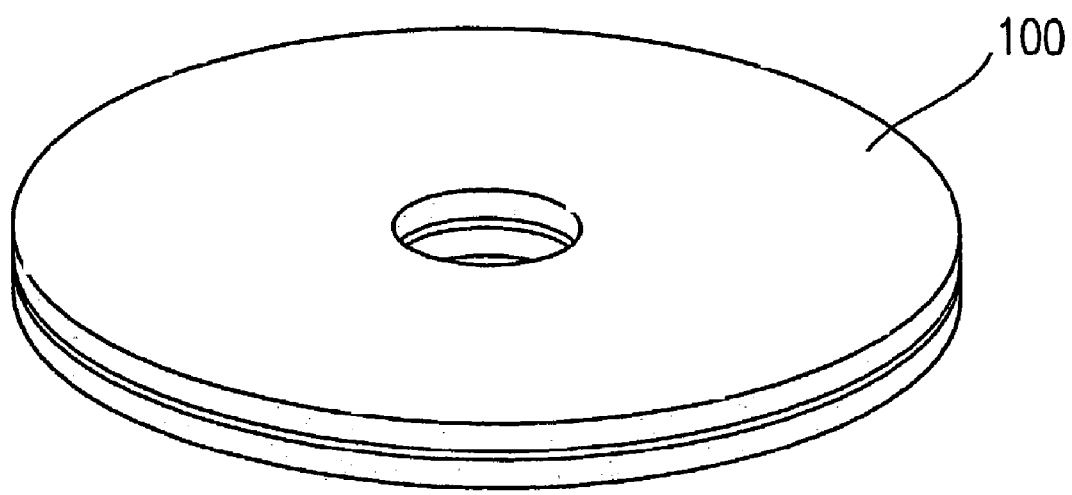
FIG. 1 shows an external view of an optical information recording medium according to the present invention.

FIG. 1 is an external view of an optical information recording medium 100 according to the present invention. Hereinafter, the optical disc 100 will be used as a specific example of the optical information recording medium 100.

Figure 2:
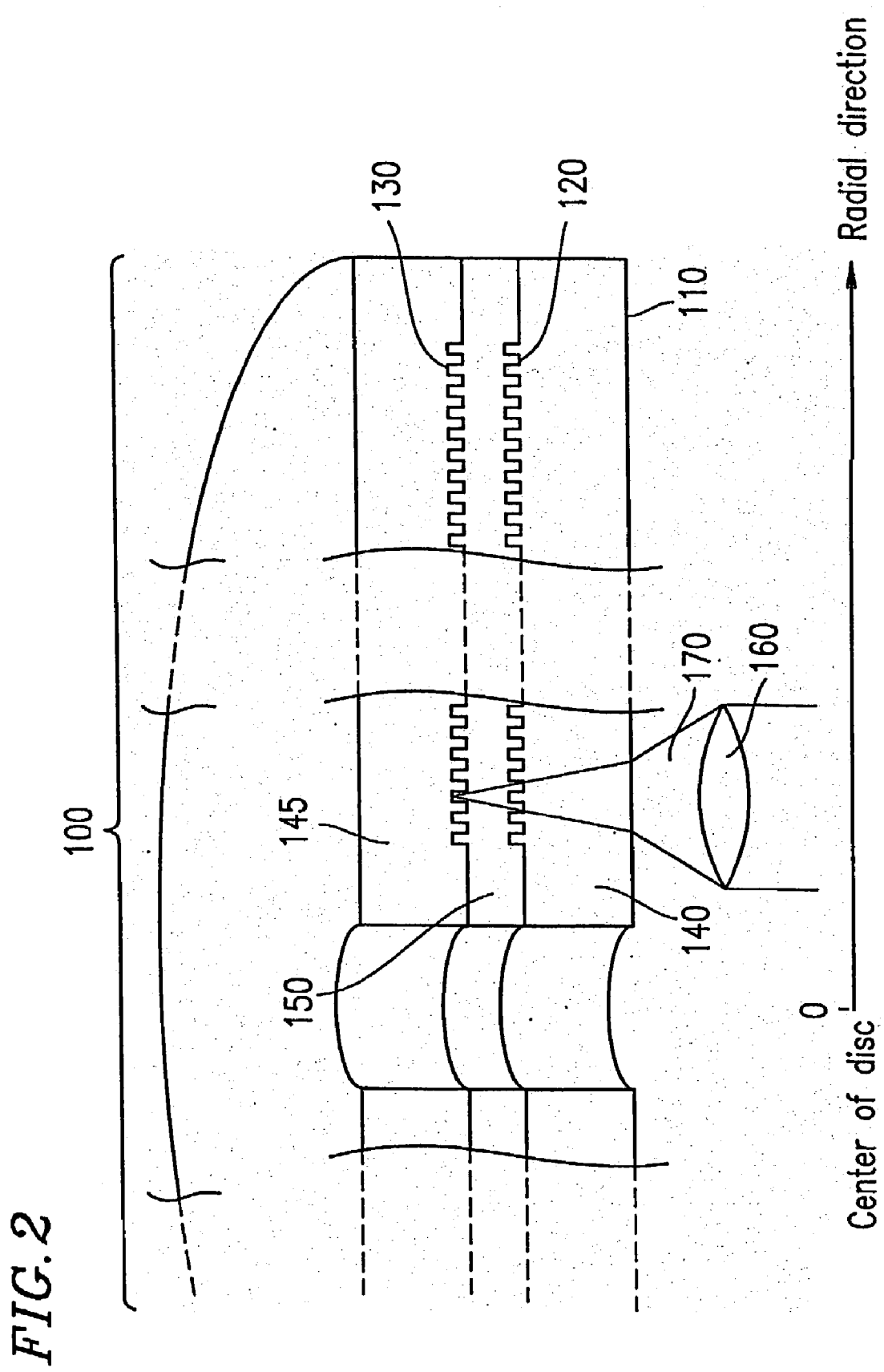
FIG. 2 is a cross-sectional view of the optical information recording medium according to the present invention.

FIG. 2 is a cross-sectional view illustrating a structure of the optical information recording medium or the optical disc 100. The optical disc 100 has a multi-layer structure. As shown in FIG. 2, the optical disc 100 includes an incidence surface 110, a first information recording layer 120, a second information recording layer 130, and a separation layer 150 for separating the first information-recording layer 120 and the second information recording layer 130 from each other.

The first information recording layer 120 and the second information recording layer 130 are formed by pre-forming a groove or a phase pit in a first substrate 140 and a second substrate 145 respectively, and then forming a protective layer, a recording layer, a reflective layer and the like thereon. The resultant first substrate 140 and the resultant second substrate 145 are bonded together with an ultraviolet-curable resin or the like, so as to form the separation layer 150. The separation layer 150 separates the first information recording layer 120 and the second information recording layer 130 from each other.

Laser light 170 is focused by an objective lens 160 and then is incident on the incidence surface 110. The laser light 170 records information on the information recording layers. FIG. 2 shows a state where information is recorded on the second information recording layer 130 by the laser light 170 which has passed through the first information recording layer 120.

Next, a format of the optical disc 100 used in this example will be described.

Figure 3:
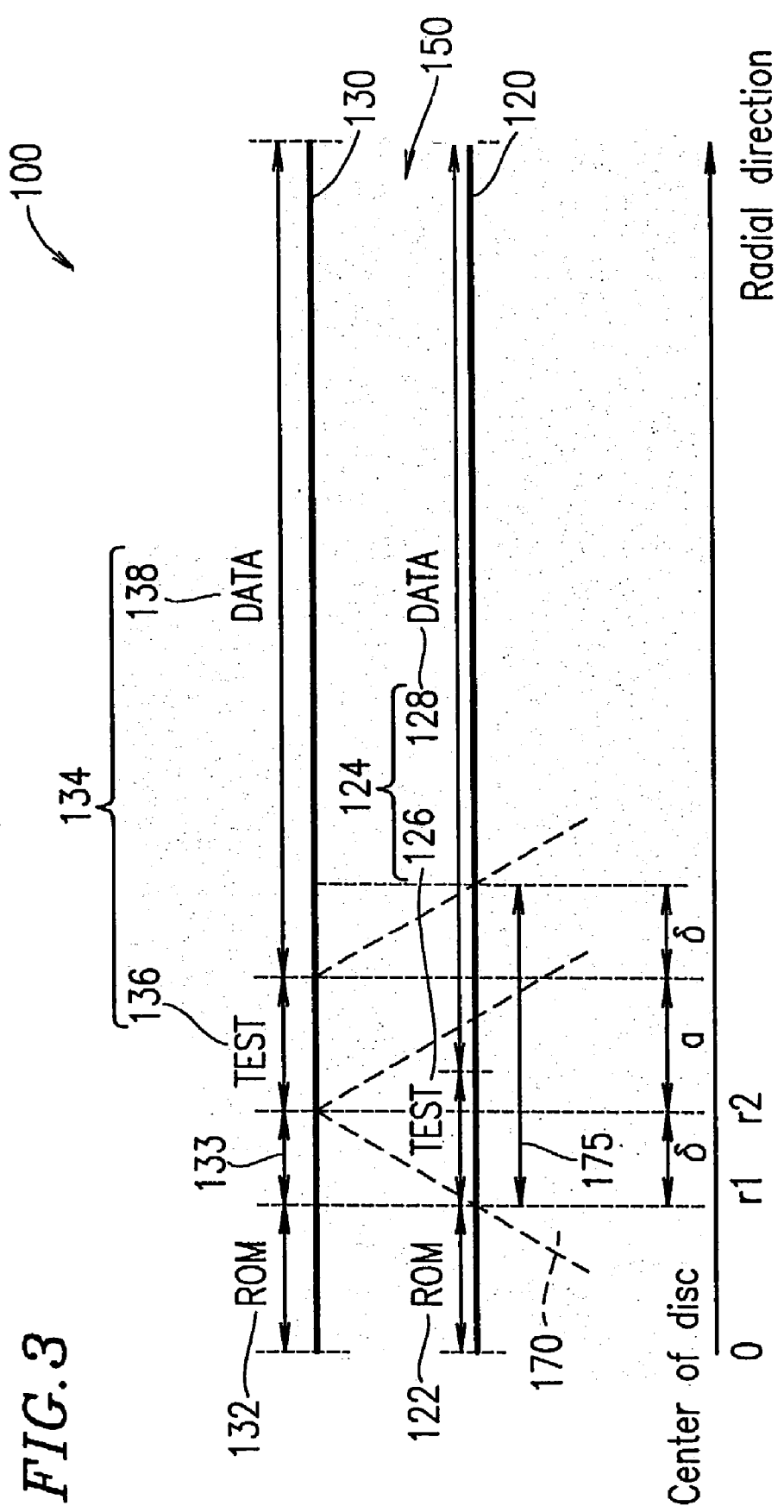
FIG. 3 shows a format of a first information recording layer and a second information recording layer according to Example 1 of the present invention.

FIG. 3 shows a format of the first information recording layer 120 and the second information recording layer 130. FIG. 3 shows the format in a radial direction of the disc from the center of the optical disc 100. The center of the optical disc 100 is represented by "0" in the radial direction. The distance along the arrow labeled as "radial direction" indicates distance from the center of the optical disc 100. The left side of the figure represents the inner side of the optical disc 100, and the right side of the figure represents the outer side of the optical disc 100. In FIG. 3, it is assumed that laser light is directed toward the optical disc 100 from the bottom portion of the figure.

The first information recording layer 120 includes a first reproduction-only area (ROM) 122 and a first recording and reproduction area (RAM) 124. The first recording and reproduction area 124 includes a first test recording area (TEST) 126 and a first data recording area (DATA) 128. In FIG. 3, the first information recording layer 120 includes the first reproduction-only area 122, the first test recording area 126, and the first data recording area 128 in that order from the inner portion thereof.

The second information recording layer 130 includes a second reproduction-only area (ROM) 132 and a second recording and reproduction area (RAM) 134. The second recording and reproduction area 134 includes a second test recording area (TEST) 136 and a second data recording area (DATA) 138. An area 133 between the second reproduction-only area 132 and the second test recording area 136 is, for example, an unused area which has not been used. In FIG. 3, the second information recording layer 130 includes the second reproduction-only area 132, the unused area 133, the second test recording area 136, and the second data recording area 138 in that order from the inner portion thereof.

In the first reproduction-only area 122 and the second reproduction-only area 132, a phase pit array representing information is formed. In the first recording and reproduction area 124 and the second recording and reproduction area 134, grooves representing information are formed.

In this specification, it is assumed that in a reproduction-only area, information which does not need to be rewritten, for example, information of the optical disc itself or address information, is recorded. By contrast, it is also assumed that in a recording and reproduction area, information which has a high possibility of being rewritten is recorded. Since different types of information are recorded in the reproduction-only area and in the recording and reproduction area, the information is recorded in different forms in the reproduction-only area and in the recording and reproduction area as described above. In the reproduction-only area, information which does not need to be rewritten is recorded. Therefore, such information is recorded with a phase pit array, simultaneously with the formation of the substrate. In the recording and reproduction area, information which has a high possibility of being rewritten is recorded. Therefore, information is recorded in the form of a recording mark on the recording layer which is formed on the grooves.

In this specification, a test recording area is used for performing test recording on the information recording layer including the test recording area. A data recording area is used for recording user data information.

In this example, the first information recording layer 120 and the second information recording layer 130 are provided from the center of the disc substantially parallel to each other and have substantially the same length as each other.

Throughout this specification, for easier understanding of the invention, when the optical information recording medium includes two information recording layers, the information recording layer which is closer to the incidence side of the optical information recording medium is referred to as the "first information recording layer", and the information recording layer which is farther from the incidence side of the optical information recording medium is referred to as the "second information recording layer". As described in detail below, the number of the information recording layers of the optical information recording medium is not limited to two. The present invention is applicable to an optical information recording medium having a plurality of information recording layers.

Returning to FIG. 3, the format of the optical disc 100 will be described.

The first recording and reproduction area 124 of the first information recording layer 120 extends from position r1 to an outer periphery of the optical disc 100.

The second test recording area 136 of the second information recording layer 130 extends from position r2 by distance a.

The start point of the first recording and reproduction area 124 is closer to the center of the disc by length δ than the start point of the second test recording area 136. In this specification, a "start point" of an area refers to the point in an area having the shortest distance from the center of the disc, and a "termination point" of an area refers to the point in an area having the longest distance from the center of the disc.

Here, it is assumed that information is recorded in the second test recording area 136 in order to perform test recording of the second information recording layer 130.

The laser light 170 for recording information in the second test recording area 136 passes through the first information recording layer 120. Since the laser light 170 is focused after being incident, an area (light spot) 175 of the first information recording layer, through which the laser light 170 passes, is larger than the second test recording area 136. In this example, the optical disc 100 is structured such that the first recording and reproduction area 124 includes the area 175 of the first information recording layer 120 through which the laser light 170 passes for recording information in the second test recording area 136. For this reason, the start point of the first recording and reproduction layer 124 is closer to the center of the disc by length δ than the start point of the second test recording area 136. In FIG. 3, only the laser light 170 incident in a portion internal to the second test recording area 136 is considered. The reason is that, since in this structure, the first recording and reproduction area 124 extends from the start point of the first test recording area 126 to the outer periphery of the disc, it is not necessary to consider the laser light 170 incident in a portion external to the second test recording area 136.

The length of the area 175 of the first information recording layer 120, through which the laser light 170 which is to be focused in the second test recording area 136 passes, equals δ+a+δ. Namely, the area 175 includes an area corresponding to the second test recording area 136 having the length a and two areas respectively extending from an inner end and an outer end of the above-mentioned area toward the center of the disc and the outer periphery of the disc, each extending area having length δ. As described above, such a size of the area 175 results from the fact that the diameter of the spot of the laser light 170 at the first information recording layer 120 is greater than that at the second information recording layer 130. In the case where the first recording and reproduction area 124 and the second test recording area 136 are located such that the first recording and reproduction area 124 includes at least the area 175, the laser light 170 passes through only the first recording and reproduction area 124 when passing through the first information recording layer 120 in the test recording performed using the second test recording area 136.

As described above, the first recording and reproduction area 124 and the second test recording area 136 are located such that the laser light 170 passes through only the first recording and reproduction area 124 when passing through the first information recording layer 120 in the test recording performed on the second test recording area 136. The reasons are as follows.

A recording and reproduction area and a reproduction-only area are formed in different forms. Therefore, the light transmittance of the recording and reproduction area may sometimes be different from the light transmittance of the reproduction-only area. When laser light passes through both the reproduction-only area and the recording and reproduction area in this case, a component of light passing through the reproduction-only area and reaching the second information recording layer and a component of light passing through the recording and reproduction area and reaching the second information recording layer will have different amounts.

The light transmittance of an unrecorded area in the recording and reproduction area can be considered to be equal to the light transmittance of the reproduction-only area. However, when the recording and reproduction area has information recorded therein, the light transmittance of a recorded area in the recording and reproduction area is different from the light transmittance of the reproduction-only area. Accordingly, when information is recorded in the recording and reproduction area of the first information recording layer, the light transmittance is different between the reproduction-only area 122 and the recording and reproduction area 124 of the first information recording layer 120.

In a recording and reproduction area, a recording mark (in an amorphous state) is formed. When the recording mark is formed, the light transmittance of the recording and reproduction area is raised in some cases and is reduced in other cases. Hereinafter, the case where the light transmittance is raised will be described. In this case, the amount of light transmitted through the recording and reproduction area is larger than amount of light transmitted through the reproduction-only area.

Figure 4:
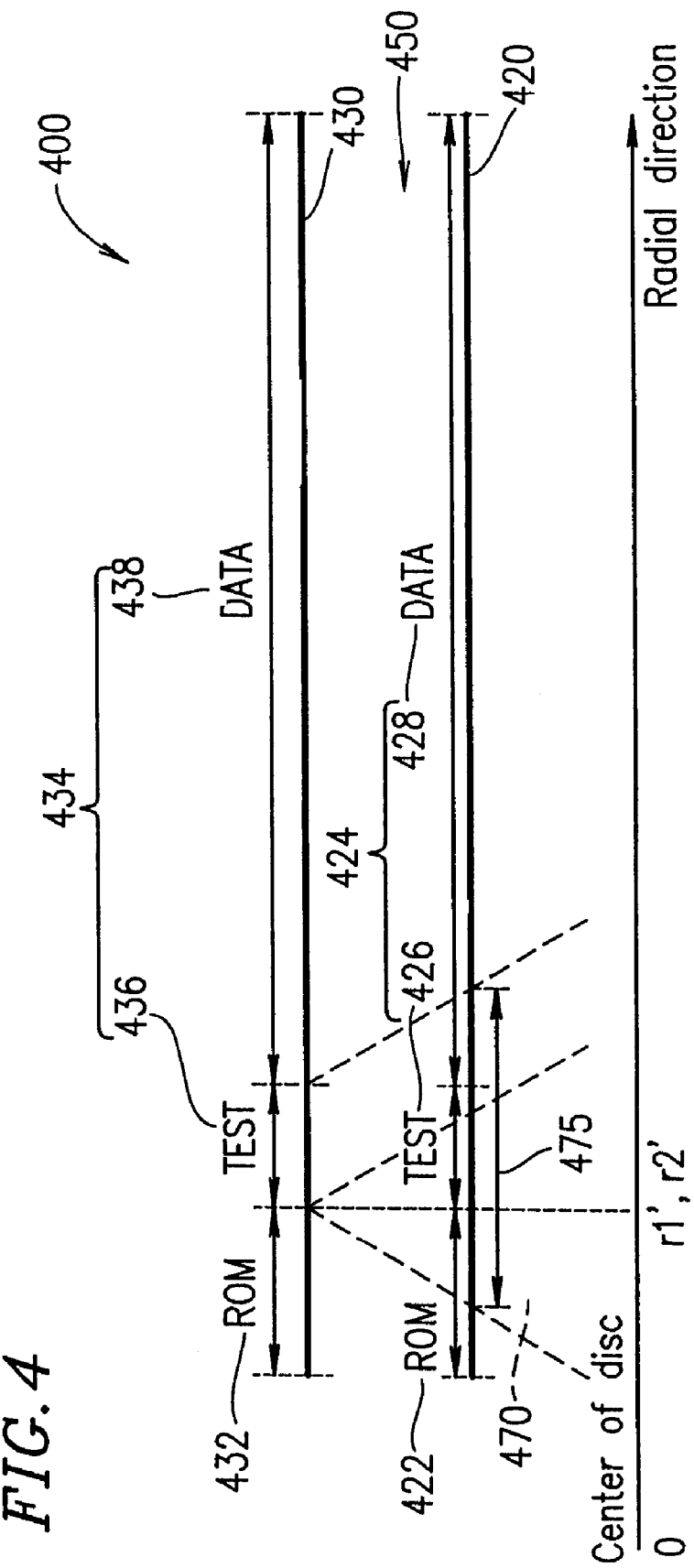
FIG. 4 shows a format of a first information recording layer and a second information recording layer of a comparative example.

For comparison, FIG. 4 shows a format of an optical disc 400 in which a first information recording layer and a second information recording layer have the same format.

The optical disc 400 includes a first information recording layer 420, a second information recording layer 430, and a separation layer 450 for separating the first information recording layer 420 and the second information recording layer 430 from each other.

The first information recording layer 420 includes a first reproduction-only area (ROM) 422 and a first recording and reproduction area (RAM) 424. The first recording and reproduction area 424 includes a first test recording area (TEST) 426 and a first data recording area (DATA) 428.

The second information recording layer 430 includes a second reproduction-only area (ROM) 432 and a second recording and reproduction area (RAM) 434. The second recording and reproduction area 434 includes a second test recording area (TEST) 436 and a second data recording area (DATA) 438.

In this comparative example, the format of the first information recording layer 420 is the same as that of the second information recording layer 430. Therefore, the start point r1' of the first recording and reproduction area 424 is the same as the start point r2' of the second test recording area 436.

In this case, when laser light 470 is incident on the innermost portion of the second test recording area 436 (i.e., the left end of the second test recording area 436 as shown in FIG. 4) for test recording of the second information recording layer 430, half of the laser light 470 incident on the first information recording layer 420 is transmitted through the first reproduction-only area 422.

As a result, the amount of laser light 470 passing through the first reproduction-only area 422 and reaching the second information recording layer 430 is different from the amount of laser light 470 passing through the first recording and reproduction area 424 and reaching the second information recording layer 430. Therefore, accurate test recording cannot be performed. For example, when the light transmittance of the recording and reproduction area is higher than the light transmittance of the reproduction-only area, recording power which is greater than the recording power of the laser light passing through the reproduction-only area is determined to be the desired recording power.

Accordingly, when test recording is performed using the innermost portion of the second test recording area 436 (i.e., the left end of the second test recording area 436 in FIG. 4) in order to obtain the desired recording power, recording power which is greater than the appropriate recording power is provided as the result of the test recording result. Therefore, actual data is recorded at excessively high recording power.

Moreover, the amount of the laser light 470 reaching the second information recording layer 430 varies in accordance with the ratio of the laser light 470 transmitted through the first reproduction-only area 422 with respect to the entire laser light 470 used for recording information in the second test recording area 436. As a result, the test recording result varies in accordance with the position of the second test recording area 436 in which information is recorded.

By contrast, with the format according to this example shown in FIG. 3, the laser light 170 is not influenced by the first reproduction-only area 122 regardless of the position in the second test recording area 136 at which test recording is performed. Accordingly, accurate recording conditions are obtained by the test recording.

Figure 5:
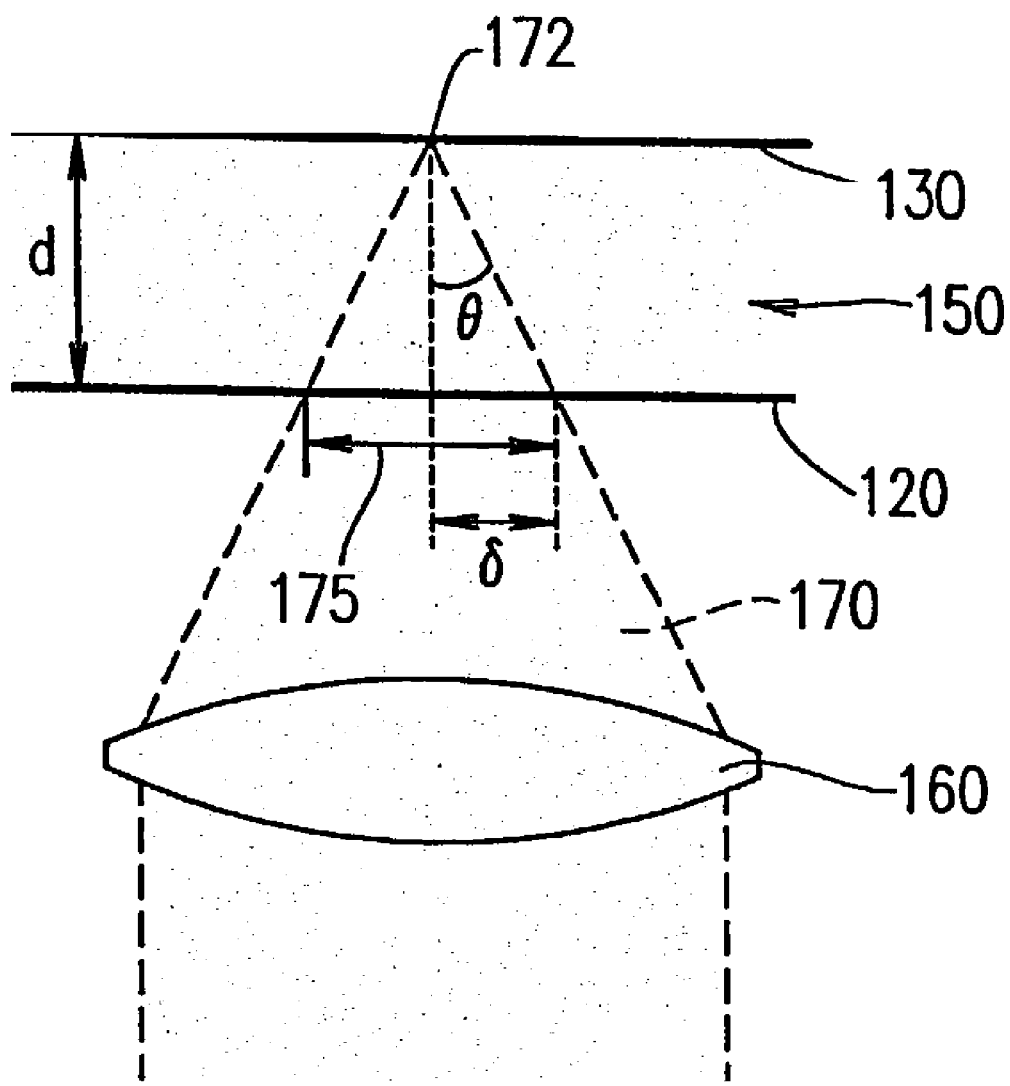
FIG. 5 shows the length of a light spot of the first information recording layer (i.e., an area of the first information recording layer, through which laser light passes) according to the present invention.

Hereinafter, with reference to FIG. 5, expansion of the light spot 175 on the first information recording layer 120 will be described in detail. FIG. 5 shows the length of the light spot 175 on the first information recording laser 120 when the laser light 170 is focused on the second information recording layer 130. Here, for simpler explanation, the laser light 170 is focused onto a focal point 172 on the second information recording layer 130. In this state, the angle θ at which the laser light 170 is focused onto the focal point 172 is:

$$\theta = \sin^{-1}(NA/n).$$

Where the distance in the thickness direction of the disc between the first information recording layer 120 and the second information recording layer 130 is d, the numerical aperture of the objective lens 160 is NA, and the refractive index of the separation layer 150 is n, the radius δ of the light spot 175 on the first information recording layer 120 is represented by:

$$\delta = d \cdot \tan \theta = d \cdot \tan(\sin^{-1}(NA/n)).$$

From this, as long as the start point of the first test recording area 126 in FIG. 3 is away from the start point of the second test recording area 136 by at least length δ represented by the above expression, the first recording and reproduction area 124 includes the light spot 175 of the laser light 170 on the first information recording layer 120. In this case, accurate recording conditions can be obtained by the test recording.

As described above, the optical information recording medium 100 according to this example is structured such that the first recording and reproduction area 124 includes the area 175 of the first information recording layer 120 of the laser light 170 for recording information in the second test recording area 136 passes. Therefore, accurate recording conditions can be obtained by the test recording.

In FIG. 3, the area between the second reproduction-only area 132 and the second test recording area 136 is the unused area 133. The present invention is not limited to this.

Figure 6:
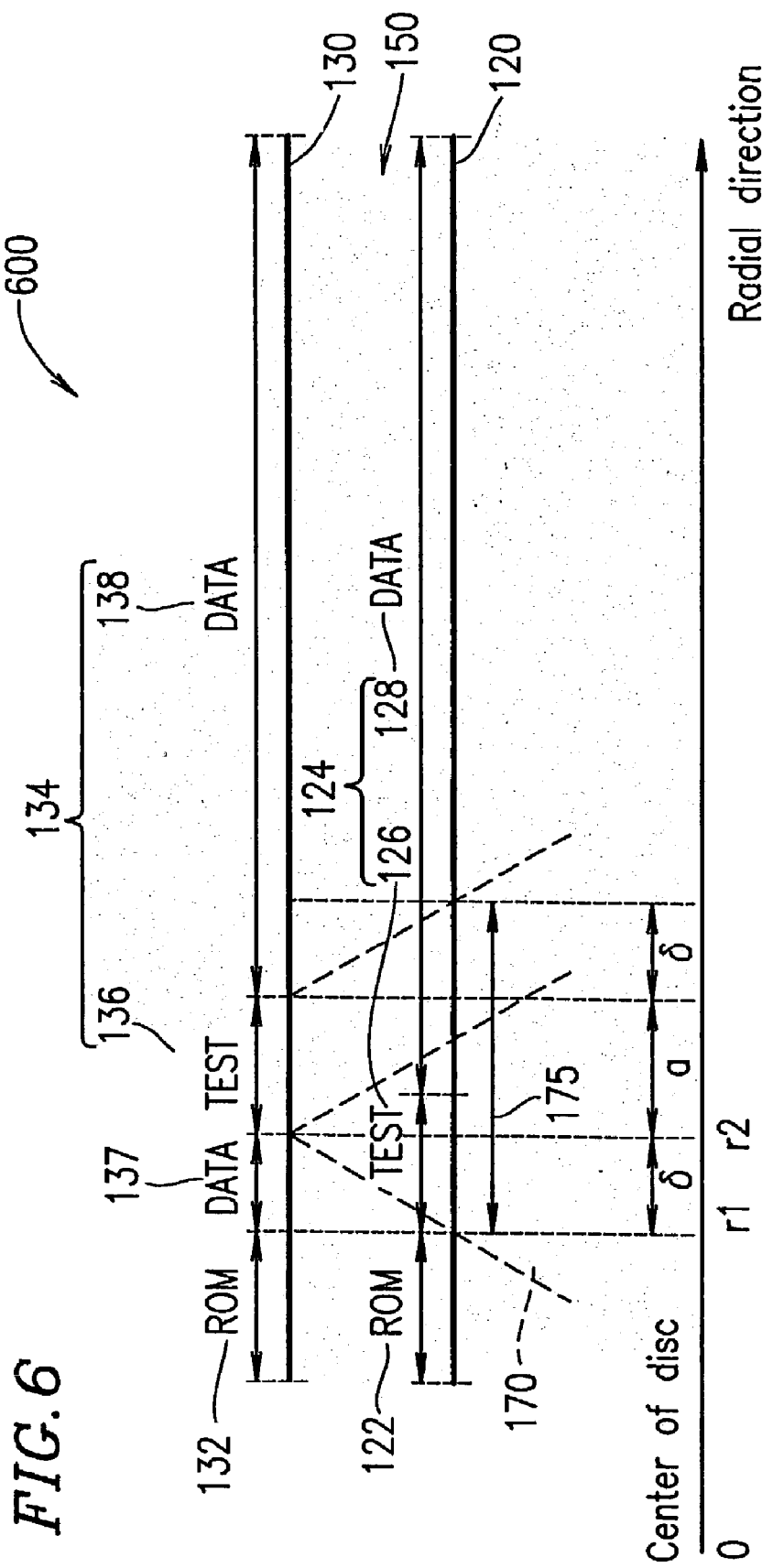
FIG. 6 shows a format of a first information recording layer and a second information recording layer according to a modified example of Example 1.

For example, as shown in FIG. 6, the unused area 133 may be replaced with a third data recording area 137. In this case, the length of the data recording area 137 is at least equal to length δ. An optical disc 600 shown in FIG. 6 has the same format as that of the optical disc 100 shown in FIG. 3 except that the unused area 133 is replaced with the third data recording area 137. Such a format can expand the data recording area compared to that of the disc 100 shown in FIG. 3.

EXAMPLE 2

In this example, a case where the center of the two information recording layers are offset with respect to each other will be described.

In actual production of a multi-layer recording medium, a plurality of information recording layers may be sometimes positionally offset with respect to each other when the information recording layers are bonded together. When the start points of the test recording areas are offset with respect to each other due to the positional offset between the information recording layers, the length δ considered in Example 1 is not sufficient. In this example, the effect of the present invention is provided even when the distances of the two information recording layers from the center of the disc are different from each other.

Figure 7:
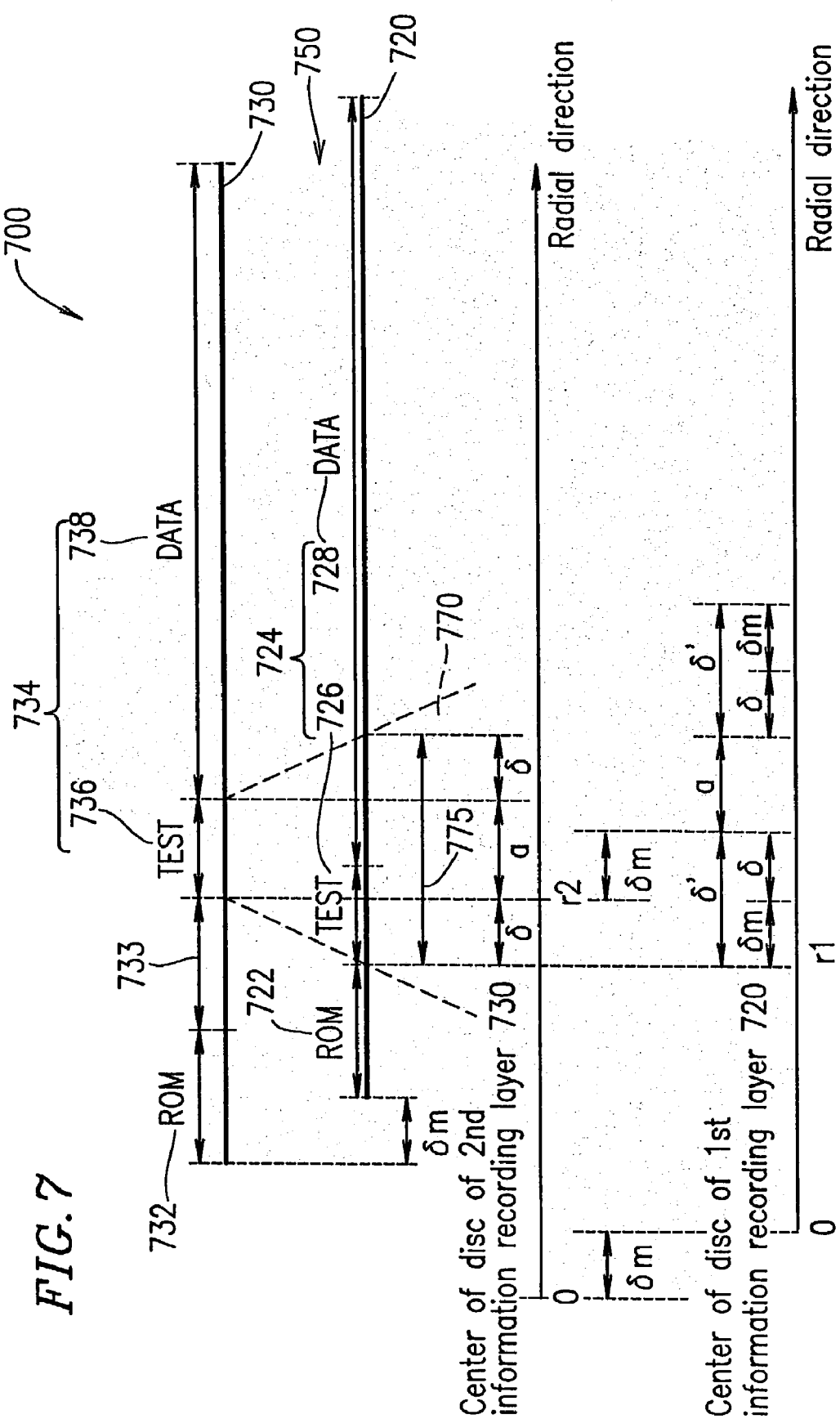
FIG. 7 shows a format of a first information recording layer and a second information recording layer according to Example 2 of the present invention.

FIG. 7 shows a format of an optical disc 700 in which a first information recording layer 720 and a second information recording layer 730 are offset with respect to each other by δm.

The optical disc 700 includes the first information recording layer 720, the second information recording layer 730, and a separation layer 750 for separating the first information recording layer 720 and the second information recording layer 730 from each other.

The first information recording layer 720 includes a first reproduction-only area (ROM) 722 and a first recording and reproduction area (RAM) 724. The first recording and reproduction area 724 includes a first test recording area (TEST) 726 and a first data recording area (DATA) 728. In FIG. 7, the first information recording layer 720 includes the first reproduction-only area 722, the first test recording area 726, and the first data recording area 728 in that order from the inner portion thereof.

The second information recording layer 730 includes a second reproduction-only area (ROM) 732 and a second recording and reproduction area (RAM) 734. The second information recording layer 730 may include an unused area 733. The second recording and reproduction area 734 includes a second test recording area (TEST) 736 and a second data recording area (DATA) 738. In FIG. 7, the second information recording layer 730 includes the second reproduction-only area 732, the unused area 733, the second test recording area 736, and the second data recording area 738 in that order from the inner portion thereof.

In this figure, the offset δ' between the start points of the first recording and reproduction area 724 and the second test recording area 736, the offset δ' being defined from the center of the disc, is represented by:

$$\delta' = r2 - r132\ \delta + \delta m = d \cdot \tan(\sin^{-1}(NA/n)) + \delta m.$$

This represents a value obtained by adding the length δ of the light spot 725 on the first information recording layer 720 described in Example 1 with the length δm of the positional offset between the first information recording layer 720 and the second information recording layer 730.

Accordingly, as long as the start of the first recording and reproduction area 724 is away from the start of the second test recording area 736 by at least the length δ' represented by the above expression, the first recording and reproduction area 724 includes a light spot 775 on the first information recording layer 720, through which laser light 770 passes, even when the first information recording layer 720 and the second information recording layer 730 are positionally offset with respect to each other by the length δm.

Considering the difference in the distances of the first information recording layer 720 and the second information recording layer 730 from the center of the disc, it is necessary that the first recording and reproduction area 724 includes the area 775. Here, the area 775 is an area of the first information recording layer 720 through which the laser light 770 used for recording information on the second test recording area 736 passes. The length of the area 775 needs to be at least δ'a+δ'. Namely, the area 775 includes an area corresponding to the second test recording area 736 having the length a and two areas respectively extending from an inner end and an outer end of the above-mentioned area toward the center of the disc and the outer periphery of the disc, each extending area having length δ'. In the case where the first recording and reproduction area 724 and the second test recording area 736 are located such that the first recording and reproduction area 724 includes the area 775, accurate recording conditions can be obtained by the test recording.

EXAMPLE 3

In this example, a case where the area of the first information recording layer, through which laser light used for recording information in the test recording area of the second information recording layer passes, is a recorded state area will be described.

Figure 8:
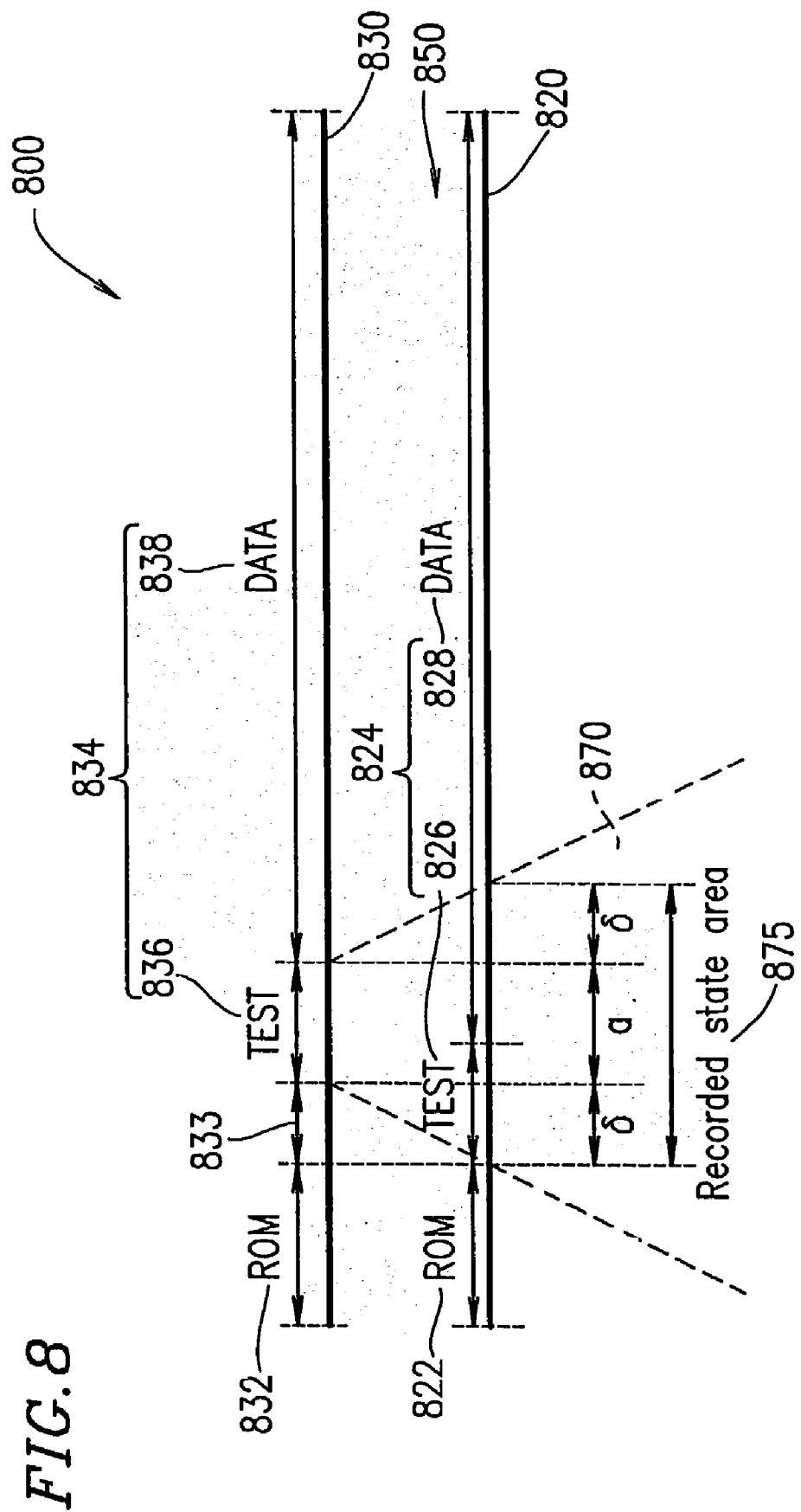
FIG. 8 shows a format of a first information recording layer and a second information recording layer according to Example 3 of the present invention.

FIG. 8 shows a format of an optical disc 800 according to this example.

The optical disc 800 includes a first information recording layer 820, a second information recording layer 830, and a separation layer 850 for separating the first information recording layer 820 and the second information recording layer 830 from each other.

The first information recording layer 820 includes a first reproduction-only area 822 and a first recording and reproduction area 824. The first recording and reproduction area 824 includes a first test recording area 826 and a first data recording area 828. In FIG. 8, the first information recording layer 820 includes the first reproduction-only area 822, the first test recording area 826, and the first data recording area 828 in that order from the inner portion thereof.

The second information recording layer 830 includes a second reproduction-only area 832 and a second recording and reproduction area 834. The second recording and reproduction area 834 includes a second test recording area 836 and a second data recording area 838. An area 833 between the second reproduction-only area 832 and the second test recording area 836 is, for example, an unused area which has not been used. In FIG. 8, the second information recording layer 830 includes the second reproduction-only area 832, an unused area 833, the second test recording area 836, and the second data recording area 838 in that order from the inner portion thereof.

In the optical disc 800, the first recording and reproduction area 824 includes a recorded state area 875 of the first information recording layer 820. Laser light 870, used for recording information in the second test recording area 836, passes through the recorded state area 875. The recorded state area 875 is entirely in a recorded state. The length of the recorded state area 875 is δ+a+δ. Namely, the recorded state area 875 includes an area corresponding to the second test recording area 836 having the length a and two areas respectively extending from an inner end and an outer end of the above-mentioned area toward the center of the disc and the outer periphery of the disc, each extending area having length δ.

The recorded state area 875 is formed by recording information in the entirety of the recorded state area 875 of the first recording and reproduction area 824, for example, before the second test recording area 836 is used.

Owing to such a structure, onto whichever position of the second test recording area 836 the laser light 870 may be focused, the light transmittance of the area of the first recording and reproduction area 824, through which the laser light 870 passes (i.e., area 875), can be uniform. The light transmittance varies depending on whether information is recorded or not in the recording and reproduction area 824. Since the area 875 is entirely in a recorded state, the light transmittance is uniform. Accordingly, as long as information is recorded in the recorded state area 875 shown in FIG. 8, the amount of the laser light 870 reaching the second test recording area 836 is uniform when test recording is performed on the second test recording area 836. As a result, accurate recording conditions can be obtained.

In this example, when the first information recording layer 820 and the second information recording layer 830 are positionally offset with respect to each other, the length of the recorded state area 875 may have the length $\delta'+a+\delta'$ as described in Example 2.

The information to be recorded in the recorded state area 875 may be information obtained by modulating data information or information obtained by modulating dummy information.

It is preferable to record information in the recorded state area 875 at the time of certification after the optical disc is produced. Since the recording apparatus does not need to perform this step, the start time when a new optical disc is mounted on the recording apparatus can be shortened.

Next, an optical recording apparatus for recording information on the optical information recording medium according to this example will be described.

Figure 9:
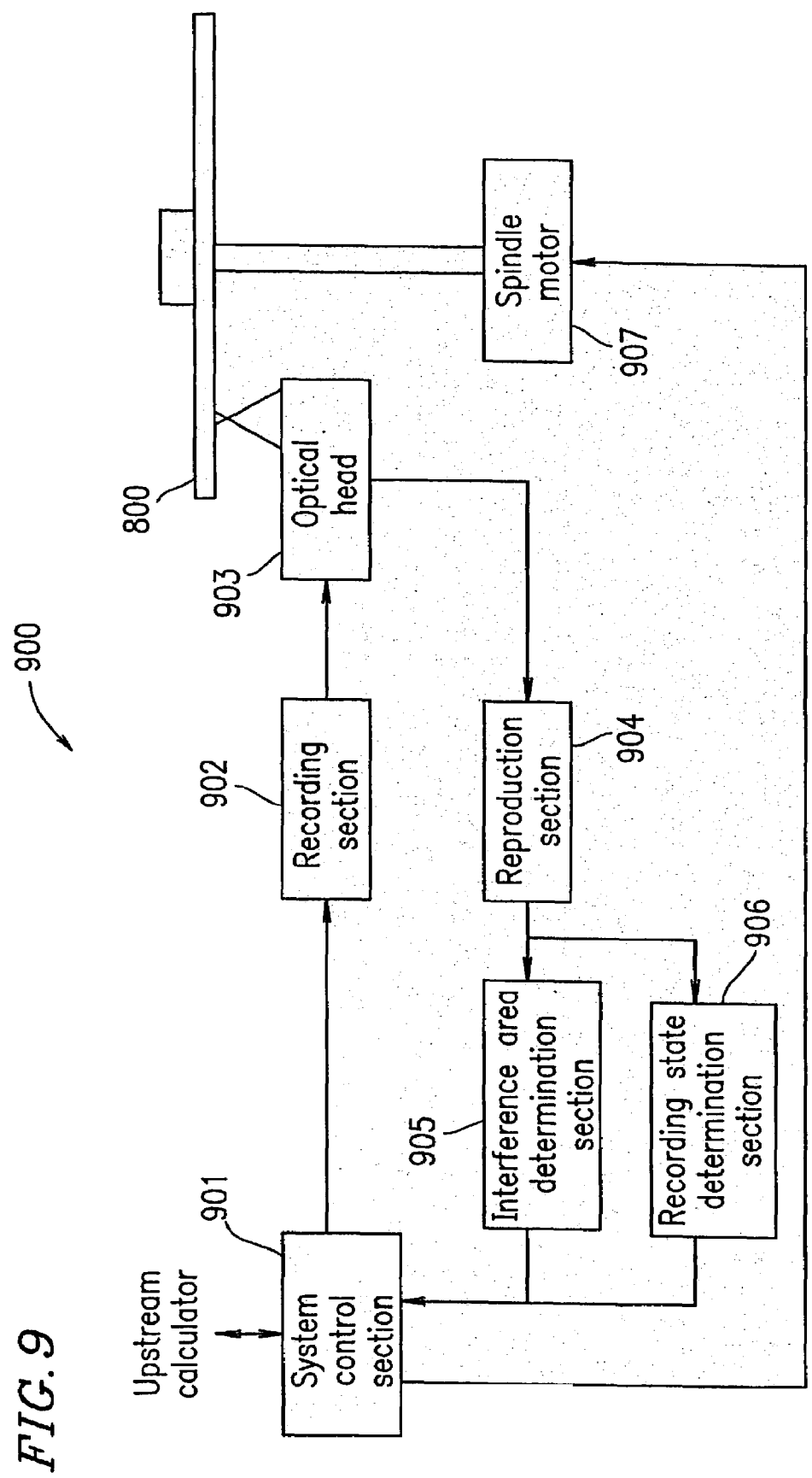
FIG. 9 is a block diagram of an optical information recording apparatus for creating an optical information recording medium according to Example 3 of the present invention.

FIG. 9 shows an optical information recording apparatus 900 for creating the optical information recording medium according to this example. Hereinafter, an operation of the optical information recording apparatus 900 will be described with reference to FIG. 9.

The optical information recording apparatus 900 includes a spindle motor 907 for rotating the optical disc 800 and an optical head 903 including a laser source (not shown) and focusing laser light to a desired position of an information recording layer of the optical disc 800. The entire operation of the optical information recording apparatus 900 is controlled by a system control section 901. It is not intended that the recorded state area 875 of the optical disc 800 is in a completely recorded state at this point.

The optical information recording apparatus 900 further includes a recording section 902 for modulating the light intensity of the laser source in the optical head 903 based on information obtained by modulating data information, and a reproduction section 904 for performing waveform processing of a reproduction signal based on the light reflected by the optical disc 800 so as to demodulate reproduction information. The optical information recording apparatus 900 also includes an interference area determination section 905 for determining whether or not a given area of the first information recording layer 820 is an area which can be an optical path of the laser light 870 for recording information in the second test recording area 836 (i.e., whether or not the given area is the area 875 through which the laser light passes for recording information in the second test recording area 836), and a recorded/unrecorded state determination section 906 for reproducing the information in the area 875 through which the laser light passes for recording information in the second test recording area 836 and then determining whether the area 875 is in a recorded state or an unrecorded state based on the reproduction result.

Hereinafter, with reference to FIGS. 8 and 9, operation of the optical information recording apparatus 900 according to this example will be described. First, the system control circuit 901 rotates the spindle motor 907, and the optical head 903 focuses the laser light 870 onto the first information recording layer 820 on the optical disc 800 so as to reproduce information on the first information recording layer 820. Based on address reproduction information from the reproduction section 904, the interference area determination section 905 determines whether the area, in which information is being reproduced, is the area 875 or not. Based on the determination result, the system control section 901 seeks for the optical head 903 up to a certain area in the area 875 and reproduces information in the certain area of the area 875.

Based on the reproduction information from the reproduction section 904, the recorded/unrecorded state determination section 906 determines whether the track in the certain area in the area 875, in which information is being reproduced, is in a recorded state or an unrecorded state. When the recorded/unrecorded state determination section 906 determines that the track is in an unrecorded state, some information is recorded in the track in the certain area in the area 875 so as to place the certain area in the area 875 into a recorded state. When the recorded/unrecorded state determination section 906 determines that the track is in a recorded state, it is confirmed that the certain area in the area 875, in which information is being reproduced, is already in a recorded state. This operation is performed for the entirety of the area 875.

In this manner, the area 875 is entirely placed into a recorded state, and thus acts as a recorded state area. Onto whichever position of the second test recording area 836 the laser light 870 may be focused, the light transmittance of the area 875 of the first information recording layer 820, through which the laser light for recording information in the second test recording area 836 passes, can be uniform. Accordingly, whichever portion of the second test recording area 836 of the second information recording layer may be used for test recording, the amount of the laser light reaching the second test recording area 836 is the same. Thus, accurate recording conditions can be obtained.

EXAMPLE 4

In Example 3, an operation for placing the area 875, of the first information recording layer, through which the laser light for recording information in the second test recording area 836 passes, into a recorded state area was described. In this example, a specific example of an operation for placing the entirety of the area of the first information recording layer, through which the laser light for recording information in the second test recording area passes, into an unrecorded state will be described.

Figure 10:
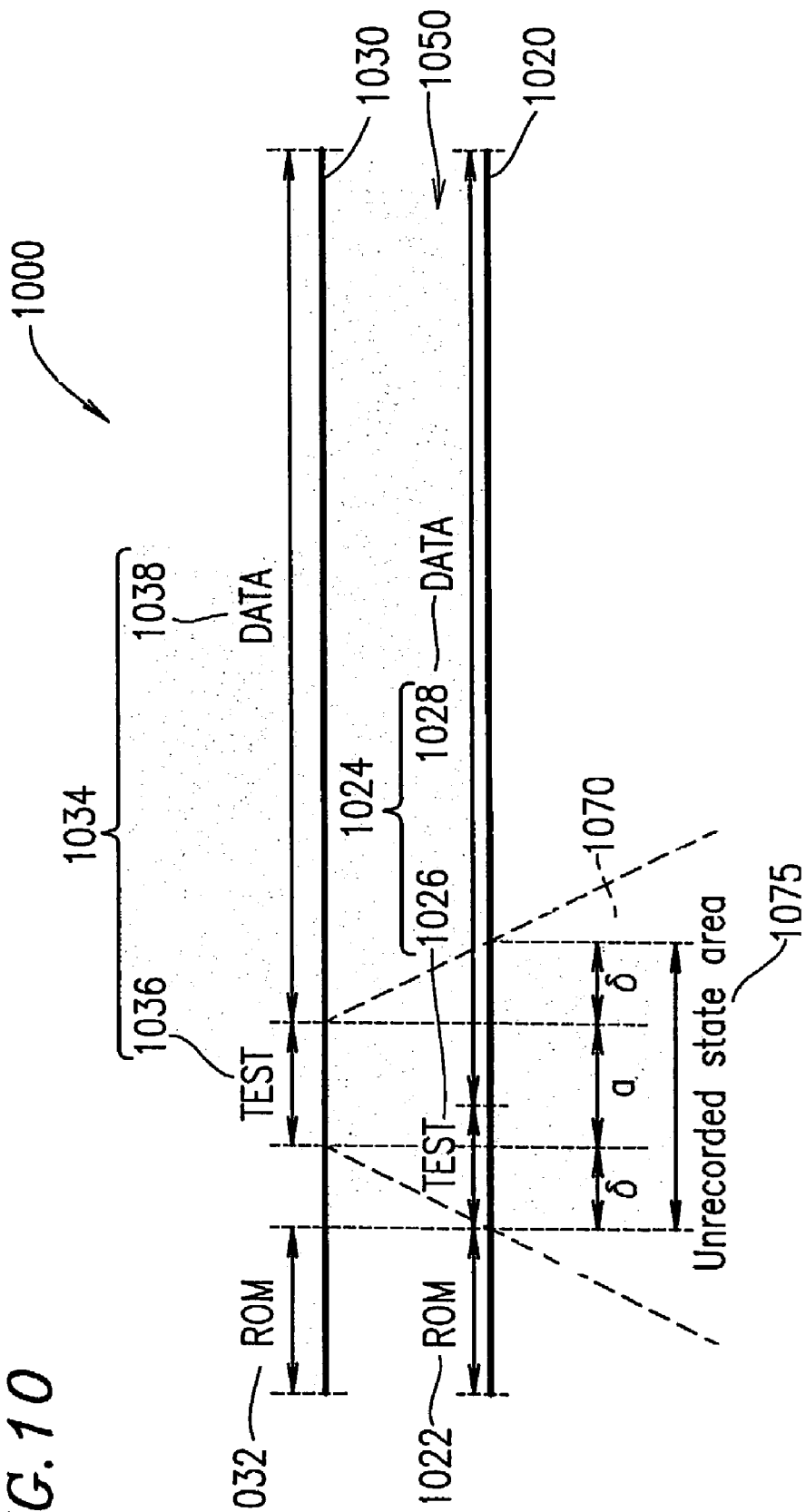
FIG. 10 shows a format of a first information recording layer and a second information recording layer according to Example 4 of the present invention.

FIG. 10 shows a format of an optical disc 1000 according to Example 4.

The optical disc 1000 includes a first information recording layer 1020, a second information recording layer 1030, and a separation layer 1050 for separating the first information recording layer 1020 and the second information recording layer 1030 from each other.

The first information recording layer 1020 includes a first reproduction-only area 1022 and a first recording and reproduction area 1024. The first recording and reproduction area 1024 includes a first test recording area 1026 and a first data recording area 1028. In FIG. 10, the first information recording layer 1020 includes the first reproduction-only area 1022, the first test recording area 1026, and the first data recording area 1028 in that order from the inner portion thereof.

The second information recording layer 1030 includes a second reproduction-only area 1032 and a second recording and reproduction area 1034. The second recording and reproduction area 1034 includes a second test recording area 1036 and a second data recording area 1038. An area 1033 between the second reproduction-only area 1032 and the second test recording area 1036 is, for example, an unused area which has not been used. In FIG. 10, the second information recording layer 1030 includes the second reproduction-only area 1032, the unused area 1033, the second test recording area 1036, and the second data recording area 1038 in that order from the inner portion thereof.

In the optical disc 1000, the first recording and reproduction area 1024 includes a unrecorded state area 1075 of the first information recording layer 1020. Laser light 1070, used for recording information in the second test recording area 1036, passes through the unrecorded state area 1075. The unrecorded state area 1075 is entirely in an unrecorded state. The length of the unrecorded state area 1075 is δ+a+δ. Namely, the recorded state area 1075 includes an area corresponding to the second test recording area 1036 having the length a and two areas respectively extending from an inner end and an outer end of the above-mentioned area toward the center of the disc and the outer periphery of the disc, each extending area having length δ.

As shown in FIG. 10, the area, of the first recording and reproduction area 1024 including the area corresponding to the second test recording area 1036 having the length a and two areas respectively extending from an inner end and an outer end of the above-mentioned area toward the center of the disc and the outer periphery of the disc, each extending area having length δ (i.e., the area of the first information recording layer 1020 having the length of δ+a+δ) is in an unrecorded state at the time of test recording.

The information for calculating optimum recording conditions based on the result of the test recording may be recorded in an arbitrary area of the first information recording layer 1020 and the second information recording layer 1030. In this case, the information for calculating the optimum recording conditions are, for example, information for multiplying the recording conditions in an unrecorded state by a certain coefficient based on, for example, the difference in the amount of transmitted light between the unrecorded state and the recorded state. In this example, the entirety of the area of the first information recording layer 1020, through which the laser light for recording information in the second test recording area 1036 passes, is in an unrecorded state. Accordingly, the recording conditions obtained in such a circumstance have a possibility of not being optimum for recording information in the second test recording area 1038 using the laser light which has passed through the first recording information recording layer 1020 having information recorded thereon.

Hereinafter, a specific example of an operation for multiplying the recording conditions in an unrecorded state by a certain coefficient based on the difference in the amount of transmitted light between the unrecorded state and the recorded state will be described.

In the case of an optical disc in which the amount of transmitted light in a recorded state is s times the amount of transmitted light in an unrecorded state, where the optimum recording power obtained by performing test recording in an unrecorded state is Pm, the optimum recording power Pk in a recorded state can be calculated as follows.

$$Pk=Pm/s$$

Here, "s" is defined as the transmittance correction coefficient. By such a calculation, even when information is not recorded in a specific area of the first information recording layer 1020 in advance, the optimum recording power in the case where the area of the first information recording layer 1020, through which the laser light passes, is in a recorded state can be estimated. In the case where it is time-consuming to form the recorded state area 875 in the first information recording layer 1020 as in Example 3, the optimum recording conditions can be calculated as in this example, instead of directly obtaining the optimum recording conditions as in Example 3.

In the case where there is a possibility that the first information recording layer 1020 and the second information recording layer 1030 in this example are positionally offset with respect to each other, it is preferable to keep the unrecorded state area 1075 having the length δ'+a+δ' unrecorded at the time of test recording as described in Example 2.

In this example, it is more preferable to record the transmittance correction coefficient s for determining the optimum recording power in a specific area in the optical disc 1000 (for example, the first reproduction-only area 1022 or the second reproduction-only area 1032). In this case, even when the transmittance correction coefficient s is different among different optical discs, the optical disc recording apparatus can immediately learn the coefficient when an optical disc is mounted on the optical disc recording apparatus. Therefore, the time required to start actually recording information can be shortened.

In this example, the unrecorded state area at the time of test recording may be a recording prohibited area where information is never recorded. Alternatively, the unrecorded state area may be a mirror area which does not have any guide grooves for tracking servo control.

EXAMPLE 5

In Examples 1 through 4, the recording and reproduction area of the first information recording layer includes a light spot of the laser light. The present invention is not limited to such a format. In this example, a format where the reproduction-only area of the first information recording layer includes a light spot of the laser light will be described.

Figure 11:
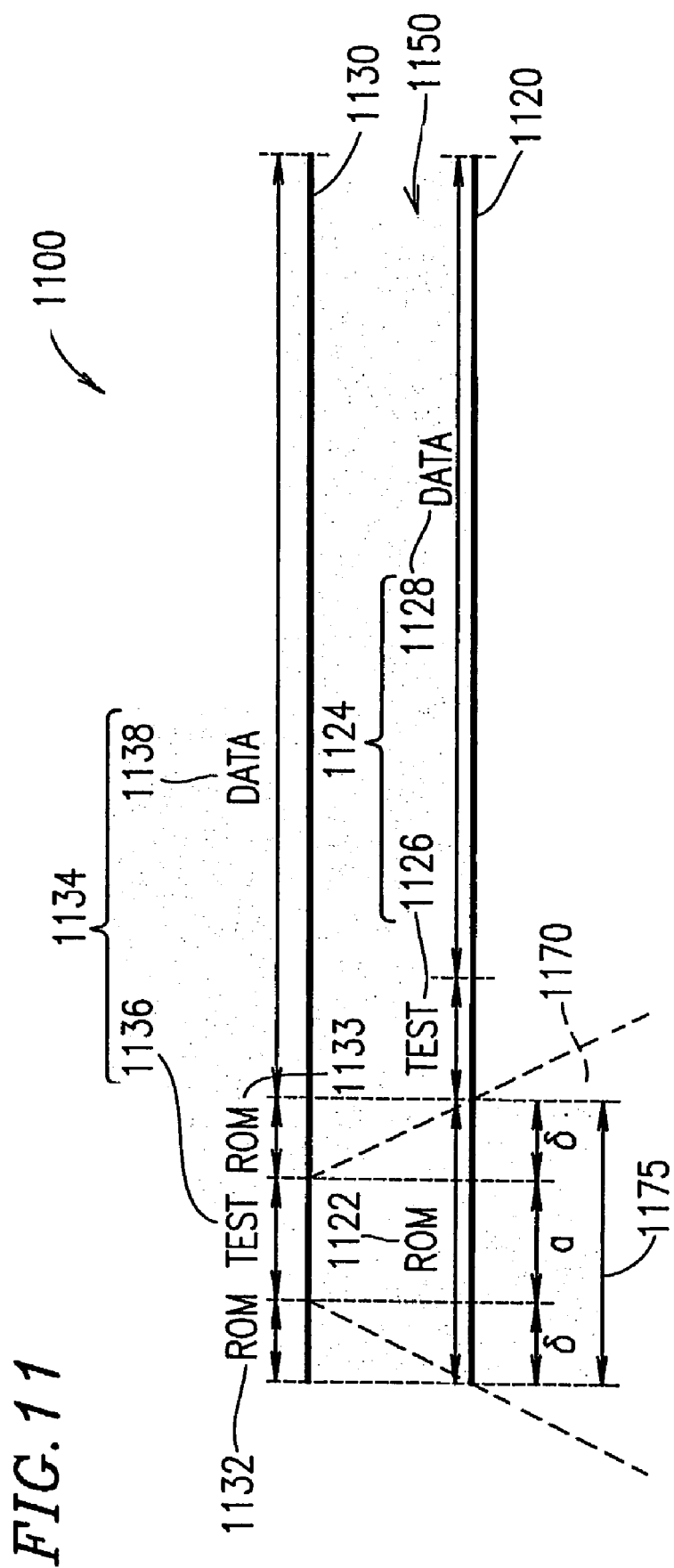
FIG. 11 shows a format of a first information recording layer and a second information recording layer according to Example 5 of the present invention.

FIG. 11 shows a format of an optical disc 1100 according to Example 5.

The optical disc 1100 includes a first information recording layer 1120, a second information recording layer 1130, and a separation layer 1150 for separating the first information recording layer 1120 and the second information recording layer 1130 from each other.

The first information recording layer 1120 includes a first reproduction-only area 1122 and a first recording and reproduction area 1124. The first recording and reproduction area 1124 includes a first test recording area 1126 and a first data recording area 1128. In FIG. 11, the first information recording layer 1120 includes the first reproduction-only area 1122, the first test recording area 1126, and the first data recording area 1128 in that order from the inner portion thereof.

The second information recording layer 1130 includes a second reproduction-only area 1132, a third reproduction-only area 1133, and a second recording and reproduction area 1134. The second recording and reproduction area 1134 includes a second test recording area 1136 and a second data recording area 1138. In FIG. 11, the second information recording layer 1130 includes the second reproduction-only area 1132, the second test recording area 1136, the third reproduction-only area 1133, and the second data recording area 1138 in that order from the inner portion thereof.

As shown in FIG. 11, the first reproduction-only area 1122 of the first information recording layer 1120 is structured so as to include an area (light spot) 1175 through which laser light 1170 for recording information in the second test recording area 1136 passes. The length of the area 1175 is δ+a+δ. Namely, the area 1175 includes an area corresponding to the second test recording area 1136 having the length a and two areas respectively extending from an inner end and an outer end of the above-mentioned area toward the center of the disc and the outer periphery of the disc, each extending area having length δ. Thus, at whichever position of the second test recording area 1136 test recording may be performed, the laser light for recording information in the second test recording area 1136 is the laser light which has passed through the first reproduction-only area 1122. As a result, the recording conditions are prevented from being dispersed depending on the position at which the test recording is performed.

In this example, as described in Example 4, it is more preferable to calculate the optimum recording conditions based on the result of the test recording. Thus, the optimum recording conditions for the case where the laser light passes through the first recording and reproduction area 1124, which is in a recorded state with a recording mark array being formed, can be estimated.

In the case where there is a possibility that the first information recording layer 1120 and the second information recording layer 1130 are positionally offset with respect to each other, the first reproduction-only area 1122 is located so as to have the length δ'+a+δ', which is the length of the area 1175 of the first information recording layer 1120, as described in Example 2.

EXAMPLE 6

In Examples 1 through 5, information is recorded in the test recording area of the second information recording layer in order to perform test recording of the second information recording layer. When data is recorded in the recording and reproduction area of the second information recording layer, as well as at the time of test recording described in Examples 1 through 5, there is a possibility of the signal quality for reproducing the recorded signal being lowered. The reason is that when the laser light used for recording passes through both the reproduction-only area and the recording and reproduction area, the amount of laser light reaching the recording and reproduction area of the second information recording layer is different depending on which one of the above two areas the laser light has passed through. As a result, accurate recording cannot be performed.

In this example, a specific example of recording information in the recording and reproduction area of the second information recording layer will be described.

Figure 12:
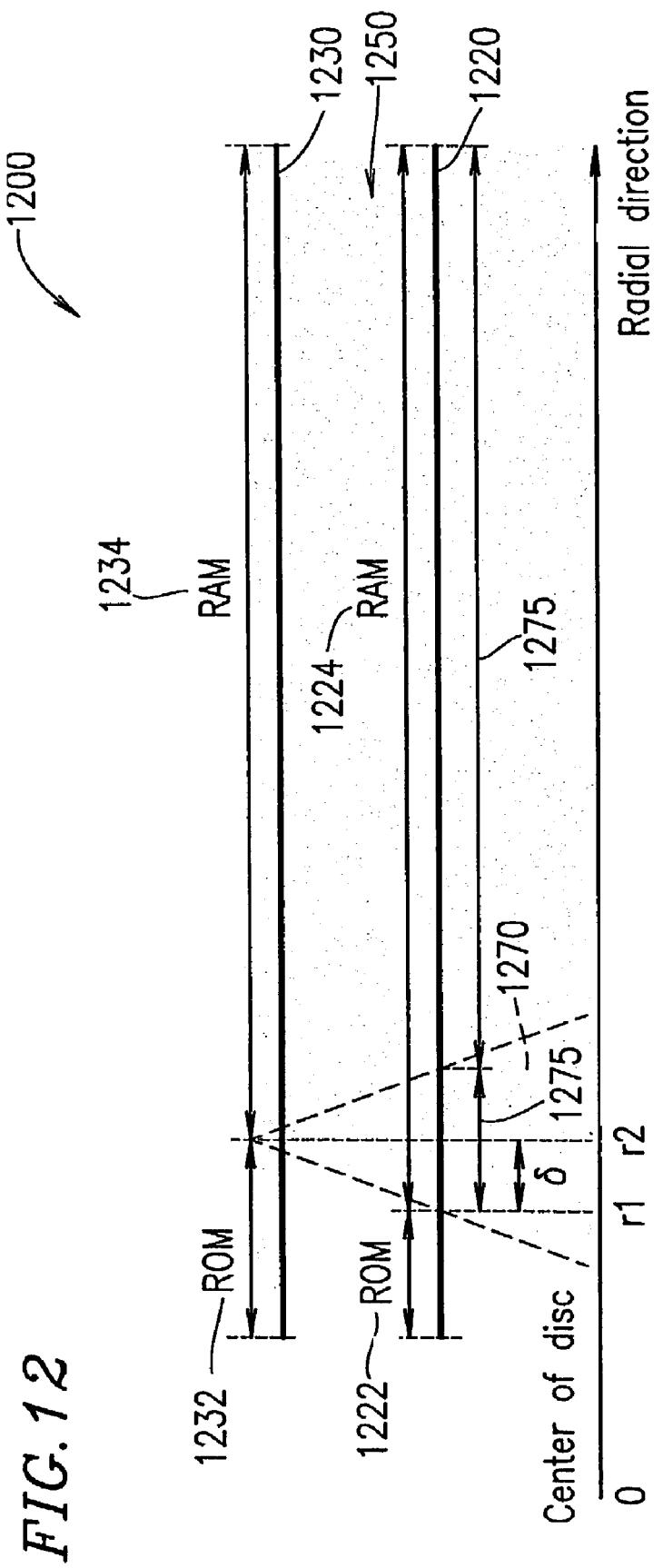
FIG. 12 shows a format of a first information recording layer and a second information recording layer according to Example 6 of the present invention.

FIG. 12 shows a format of an optical disc 1200 according to Example 6.

The optical disc 1200 includes a first information recording layer 1220, a second information recording layer 1230, and a separation layer 1250 for separating the first information recording layer 1220 and the second information recording layer 1230 from each other.

The first information recording layer 1220 includes a first reproduction-only area 1222 and a first recording and reproduction area 1224. In FIG. 12, the first information recording layer 1220 includes the first reproduction-only area 1222 and the first recording and reproduction area 1224 in that order from the inner portion thereof.

The second information recording layer 1230 includes a second reproduction-only area 1232 and a second recording and reproduction area 1234. In FIG. 12, the second information recording layer 1230 includes the second reproduction-only area 1232 and the second recording and reproduction area 1234 in that order from the inner portion thereof.

As shown in FIG. 12, the first reproduction-only area 1222 is preferably smaller than the second reproduction-only area. 1232 of the second information recording layer 1230.

In FIG. 12, the start point of the first recording and reproduction area 1224 is located closer to the center of the disc than the start point of the second recording and reproduction area 1234 by length δ. Owing to such a structure, in whichever portion of the second recording and reproduction area 1234 information may be recorded, the first recording and reproduction area 1224 includes an area 1275 of the first information recording layer 1220 through which the laser light for recording information in the second recording and reproduction area 1234 passes. Therefore, the second recording and reproduction area 1234 is only influenced by the first recording and reproduction area 1224 and is not influenced by the first reproduction-only area 1222. Thus, information can be accurately recorded in the second recording and reproduction area 1234.

In the case where there is a possibility that the first information recording layer 1220 and the second information recording layer 1230 are positionally offset with respect to each other, the start point of the first recording and reproduction area 1224 and the start point of the second recording and reproduction area 1234 are preferably offset with respect to each other by δ' as described in Example 2.

In FIG. 12, the size of the first reproduction-only area 1222 may be zero. In this case, it is not necessary to form a phase pit for the first reproduction-only area 1222 at the time of production of the first information recording layer 1200. Thus, the production process of the disc can be simplified.

EXAMPLE 7

In Examples 1 through 6, there are two information recording layers. The present invention is not limited to this. According to the present invention, the number of information recording layers may be three or more.

Figure 13:
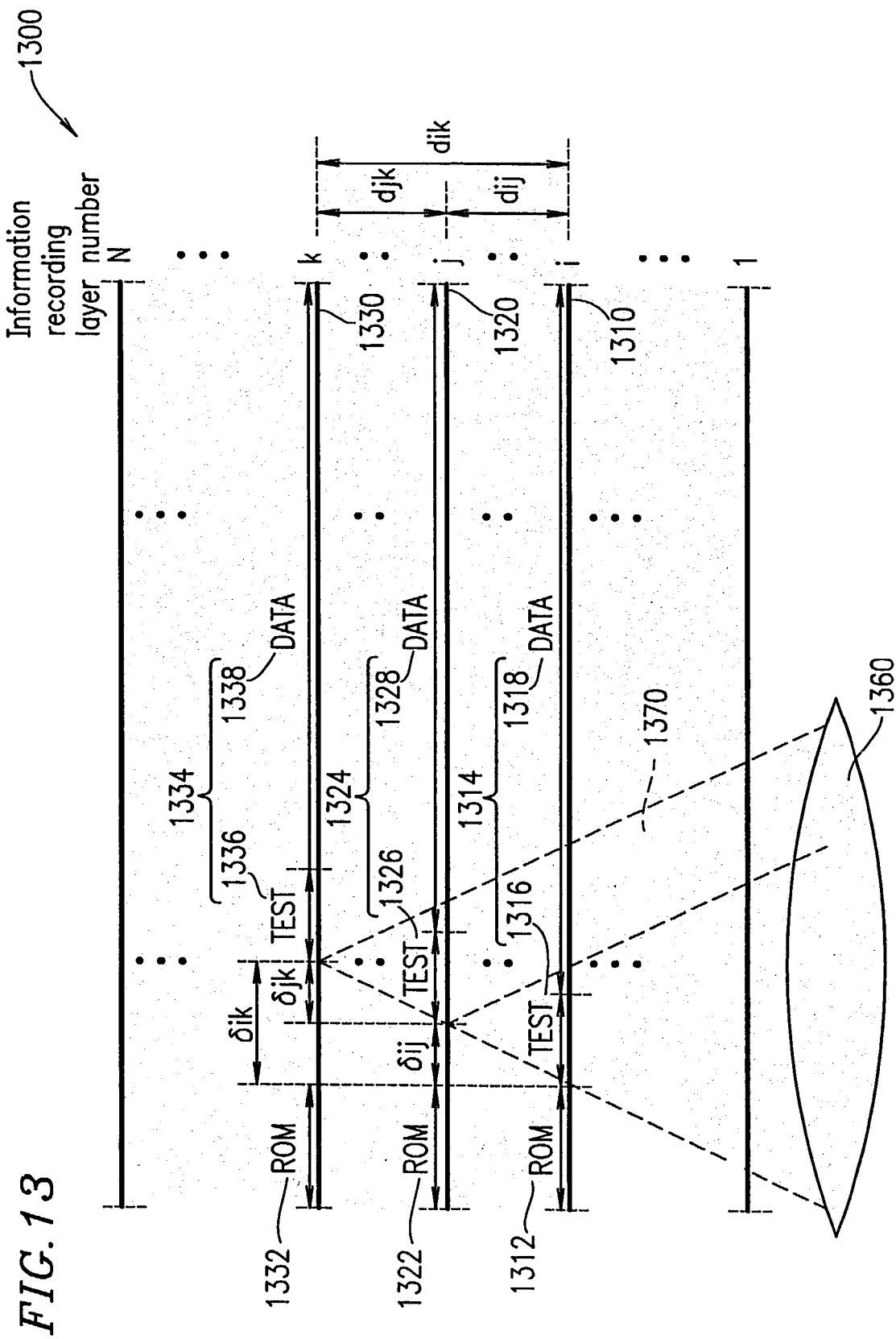
FIG. 13 shows a format of a plurality of information recording layers according to Example 7 of the present invention.

FIG. 13 shows a format of an optical disc 1300 according to Example 7 of the present invention.

The optical disc 1300 is obtained by expanding the optical disc in Example 1, and has a different format from that of the optical disc in Example 1. The optical disc 1300 includes N number of information recording layers. In FIG. 13, among the N number of information recording layers, three information recording layers i, j and k each have a reproduction area in order to obtain accurate recording conditions by the test recording.

In this example, a first information recording layer 1310 is the i'th layer, a second information recording layer 1320 is the j'th layer, a third information recording layer 1330 is the k'th layer, from the laser incidence side of the disc. The distance between the first information recording layer 1310 and the second information recording layer 1320 is dij, the distance between the second information recording layer 1320 and the third information recording layer 1330 is djk, and distance between the first information recording layer 1310 and the third information recording layer 1330 is dik.

The first information recording layer 1310 includes a first reproduction-only area 1312 and a first recording and reproduction area 1314. The first recording and reproduction area 1314 includes a first test recording area 1316 and a first data recording area 1318.

The second information recording layer 1320 includes a second reproduction-only area 1322 and a second recording and reproduction area 1324. The second recording and reproduction area 1324 includes a second test recording area 1326 and a second data recording area 1328.

The third information recording layer 1330 includes a third reproduction-only area 1332 and a third recording and reproduction area 1334. The third recording and reproduction area 1334 includes a third test recording area 1336 and a third data recording area 1338.

In this case, the start point of the first recording and reproduction area 1312 is at least δij away from the start point of the second test recording area 1326, and is at least δik away from the start point of the third test recording area 1336. The start point of the second recording and reproduction area 1324 is at least δjk away from the start point of the third test recording area 1336. Here, $$\delta ij = dij \cdot \tan(\sin^{-1}(NA/n)),$$

$$\delta ik = dik \cdot \tan(\sin^{-1}(NA/n)), \text{ and}$$

$$\delta jk = djk \cdot \tan(\sin^{-1}(NA/n)),$$

where NA is the numerical aperture of an objective lens for focusing laser light 1370, and n is the refractive index of the separation layer between the first information recording layer 1310 and the second information recording layer 1320 and of the separation layer between the second information recording layer 1320 and the third information recording layer 1330.

Owing to such a structure, the laser light 1370 for recording information in the second test recording area 1326 passes through only the first recording and reproduction area 1314 when passing through the first information recording layer 1310. The laser light 1370 for recording information in the third test recording area 1336 passes through only the first recording and reproduction area 1314 when passing through the first information recording layer 1310 and only the second recording and reproduction area 1324 when passing through the second information recording layer 1320.

Even when the information recording layer as a target is, for example, between the first information recording layer 1310 and the second information recording layer 1320 as in this example or at an arbitrary position, substantially the same effect as that in Example 1 is provided, as long as the second information recording layer 1320 is farther from the incidence surface than the first information recording layer 1310, and an area of the first information recording layer 1310, through which the laser light 1370 for recording information in the second test recording area 1326 passes, is entirely a recording and reproduction area.

EXAMPLE 8

Figure 14:
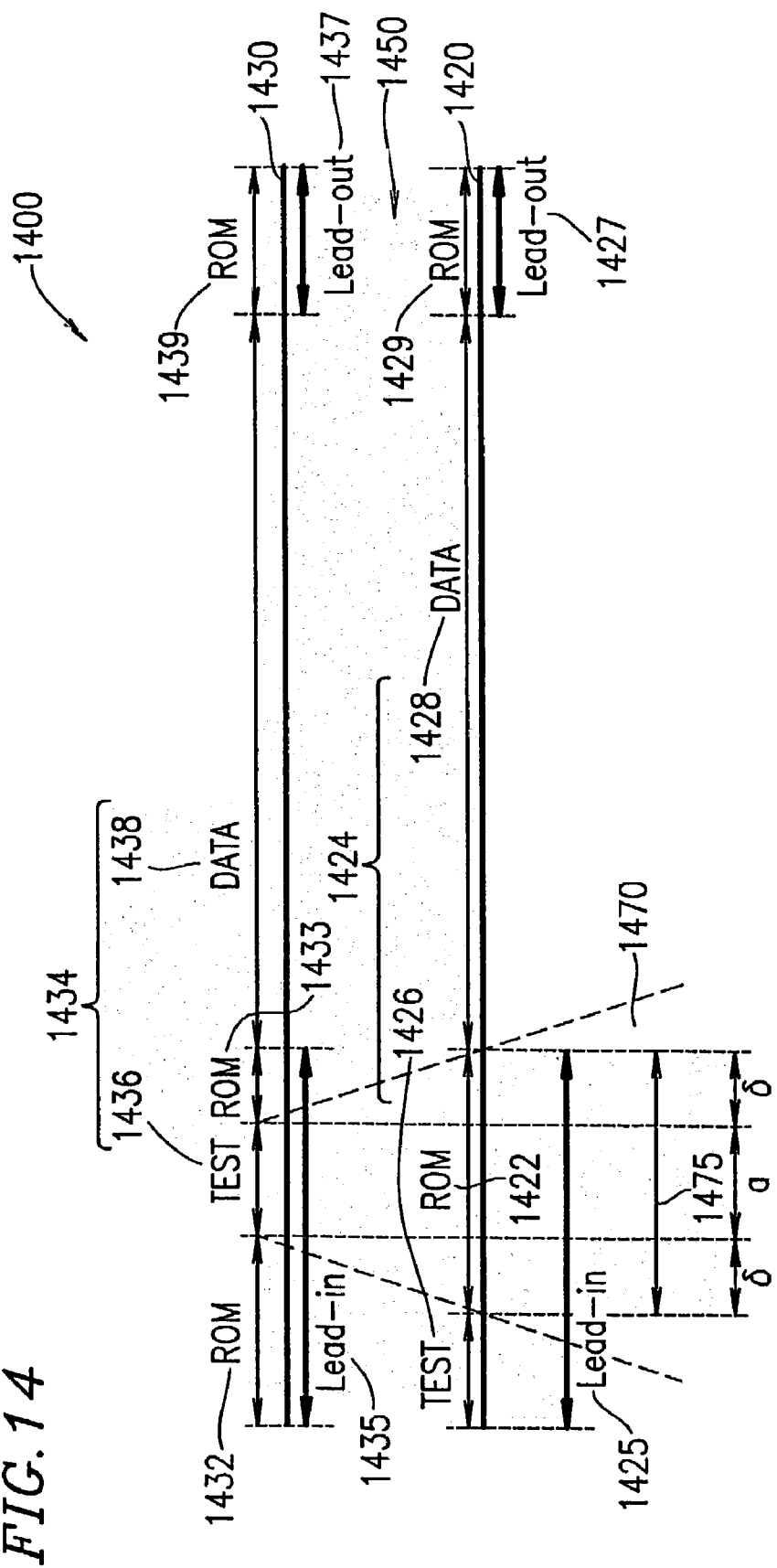
FIG. 14 shows a format of a first information recording layer and a second information recording layer according to Example 8 of the present invention.

FIG. 14 shows a format of an optical disc 1400 according to Example 8 of the present invention.

The optical disc 1400 includes a first information recording layer 1420, a second information recording layer 1430, and a separation layer 1450 for separating the first information recording layer 1420 and the second information recording layer 1430 from each other.

The first information recording layer 1420 includes a first reproduction-only area 1422, a first recording and reproduction area 1424 and a second reproduction-only area 1429. The first recording and reproduction area 1424 includes a first test recording area 1426 and a first data recording area 1428. In FIG. 14, the first information recording layer 1420 includes the first test recording area 1426, the first reproduction-only area 1422, the first data recording area 1428, and the second reproduction-only area 1429 in that order from the inner portion thereof. The first information recording layer 1420 includes a first lead-in area 1425 and a first lead-out area 1427. The first lead-in area 1425 includes the first test recording area 1426 and the first reproduction-only area 1422. The first lead-out area 1427 includes the second reproduction-only area 1429.

The second information recording layer 1430 includes a third reproduction-only area 1432, a second recording and reproduction area 1434, a fourth reproduction-only area 1433, and a fifth reproduction-only area 1439. The second recording and reproduction area 1434 includes a second test recording area 1436 and a second data recording area 1438. In FIG. 14, the second information recording layer 1430 includes the third reproduction-only area 1432, the second test recording area 1436, the fourth reproduction-only area 1433, the second data recording area 1438, and the fifth reproduction-only area 1439 in that order from the inner portion thereof. The second information recording layer 1430 includes a second lead-in area 1435 and a second lead-out area 1437. The second lead-in area 1435 includes the third reproduction-only area 1432, the second test recording area 1436, and the fourth reproduction-only area 1433. The second lead-out area 1437 includes the fifth reproduction-only area 1439.

In this example, when priority is put on easy management of the optical disc 1400, it is preferable to have the format shown in FIG. 14 in which the first data recording area 1428 and the second data recording area 1438 have an equal size. The optical disc 1400 includes the first lead-in area 1425 and the second lead-in area 1435 internally to the first data recording area 1428 and the second data recording area 1438, respectively. The optical disc 1400 also includes the first lead-out area 1427 and the second lead-out area 1439 externally to the first data recording area 1428 and the second data recording area 1438, respectively. The first test recording area 1426 is located internally to the first lead-in area 1425, and the second test recording area 1436 is located internally to the second lead-in area 1435.

The first test recording area 1426 and the second test recording area 1436 are positionally offset with respect to each other by length δ or more. The first reproduction-only area 1422 includes a non-uniform light prevention area 1475 of the first information recording layer 1410 through which laser light 1470 for recording information in the second test recording area 1436 passes. The length of the area 1475 is represented by δ+a+δ. The non-uniform light prevention area 1475 prevents the laser light 1470 incident thereon from transmitting therethrough in a non-uniform shape.

The non-uniform light prevention area 1475 is, for example, a reproduction-only area.

Alternatively, the non-uniform light prevention area 1475 may be a recording prohibited area or a mirror area. Owing to such a structure, at whichever position of the second test recording area 1436 test recording may be performed, the obtained recording conditions are not dispersed. Moreover, owing to such a structure, the first lead-in area 1425 of the first information recording layer 1420 and the second lead-in area 1435 of the second information recording layer 1430 can have identical start points, termination points and capacities. The first data recording area 1428 of the first information recording layer 1420 and the second data recording area 1438 of the second information recording layer 1430 can have identical start points, termination points and capacities. The first lead-out area 1427 of the first information recording layer 1420 and the second lead-out area 1437 of the second information recording layer 1430 can have identical start points, termination points and capacities. Therefore, defect management and recording information management of the optical disc 1400 are advantageously easy. Substantially the same effect is provided when the first test recording area 1426 is located in the first lead-out area 1427 and the second test recording area 1436 is located in the second lead-out area 1437.

The positions of the areas and the shape of the disc used in the above examples are not limited to those described above, and may be of any appropriate form in accordance with the medium itself or the recording and reproduction apparatus.

INDUSTRIAL APPLICABILITY

As described above, according to an optical information recording medium of the present invention, an area of the first information recording layer, through which laser light passes, is entirely placed into a recorded state or an unrecorded state at the time of test recording of the second information recording layer. Therefore, accurate recording conditions can be obtained by the test recording.

According to an optical information recording medium of the present invention, an area of the first information recording layer, through which laser light passes, is entirely placed into a reproduction-only area or a recording and reproduction area at the time of test recording of the second information recording layer. Therefore, accurate recording conditions can be obtained by the test recording.

According to an optical information recording medium of the present invention, the reproduction-only area of the first information recording layer is made smaller than the reproduction-only area of the second information recording layer. Therefore, information can be accurately recorded anywhere in the recording and reproduction area of the second information recording layer.

According to an optical information recording medium of the present invention, when recording information in the recording and reproduction area of the second information recording layer, an area of the first information recording layer, through which laser light passes, is entirely placed into a reproduction-only area or a recording and reproduction area. Therefore, information can be accurately recorded in the recording and reproduction area.

According to an optical information recording method of the present invention, information is recorded in an area of the recording and reproduction area of the first information recording layer through which laser light passes before test recording of the second information recording layer. Therefore, accurate recording conditions can be obtained by the test recording.

According to a recording and reproduction method of the present invention, in the case where an area of the recording and reproduction area of the first information recording layer through which laser light passes is in an unrecorded state at the time of test recording of the second information recording layer, optimum recording conditions are calculated based on the test recording result. Therefore, accurate recording conditions can be obtained.

In a medium according to the present invention, one of the reproduction-only area and the recording and reproduction area of the first information recording layer includes an area through which laser light for recording information in the test recording area of the second information recording layer passes. The laser light for recording information in the test recording area of the second information recording layer has passed through the reproduction-only area or the recording and reproduction area. Accordingly, the laser light for recording information in the test recording area of the second information recording layer is not influenced by the difference between the amount of light passing through the reproduction-only area of the first information recording layer and the amount of light passing through the recording and reproduction area of the first information recording layer. As a result, accurate recording conditions can be obtained using the test recording area of the second information recording layer.

The area of the first information recording layer, through which the laser light for recording information in the test recording area passes, extends outward from an outer end of an area of the first information recording layer corresponding to the test recording area by a length $\delta$, the length $\delta$ being represented by:

$$\delta = d \cdot \tan(\sin^{-1}(NA/n)),$$

where d is a distance in a thickness direction between the first information recording layer and the second information recording layer: n is a refractive index of the separation layer; and NA is a numerical aperture of an objective lens for focusing the laser light to the test recording area.

The area of the first information recording layer, through which the laser light for recording information in the test recording area passes, extends outward from the outer end of the area of the first information recording layer corresponding to the test recording area by a length $\delta'$, the length $\delta'$ being represented by:

$$\delta' = d \cdot \tan(\sin^{-1}(NA/n)) + \delta m$$

where $\delta m$ is a maximum positional offset distance between the first information recording layer and the second information recording layer.

Accordingly, even when there is a non-negligible offset or eccentricity in the relative positions of the information recording layers, accurate recording conditions for the second information recording layer can be obtained at the time of test recording of the second information recording layer, with no influence of the difference in the amount of light passing through the first information recording layer.

It is preferable to form an area of the second information recording laser, extending from the end of at least the test recording area by $\delta$ (in the case where there is a non-negligible offset or eccentricity in the relative positions of the information recording layers, by $\delta'$) into a data recording area. This is preferable in order to expand the data recording area.

According to the medium of the present invention, a prescribed area of the first information recording layer, which is entirely in a recorded state or an unrecorded state, includes an area through which the laser light for recording information in the test recording area of the second information recording layer passes. The area of the first information recording layer, through which the laser light for recording information in the test recording area of the second information recording layer passes, is entirely either in a recorded state or in an unrecorded state. Accordingly, the laser light for recording information in the test recording area of the second information recording layer is not influenced by the difference in the amount of light caused by the existence of both a recorded state area and an unrecorded state area. As a result, accurate recording conditions can be obtained using the test recording area of the second information recording layer.

The prescribed area which is entirely in an unrecorded area is, for example, a recording prohibited area, a mirror area, or a lead-in area.

Regarding a second optical information recording medium according to the present invention, the area of the first information recording layer, through which the laser light for recording information in the test recording area of the second information recording layer passes, extends outward from an outer end of an area of the first information recording layer corresponding to the test recording area by a length δ, the length δ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the test recording area.

Regarding the second optical information recording medium according to the present invention, the area of the first information recording layer, through which the laser light for recording information in the test recording area of the second information recording layer passes, extends outward from the outer end of the area of the first information recording layer corresponding to the test recording area by a length δ', the length δ' being represented by:

$$\delta' = d \cdot \tan(\sin^{-1}(NA/n)) + \delta m$$

where δm is a maximum positional offset distance between the first information recording layer and the second information recording layer.

Owing to such a medium, even when there is a non-negligible offset or eccentricity in the relative positions of the information recording layers, accurate recording conditions for the second information recording layer can be obtained at the time of test recording of the second information recording layer, with no influence of the difference in the amount of light passing through the first information recording layer.

Regarding the second optical information recording medium according to the present invention, it is preferable to form an area of the second information recording laser, extending from the-end of at least the test recording area by δ (in the case where there is a non-negligible offset or eccentricity in the relative positions of the information recording layers, by δ') into a data recording area. This is preferable in order to expand the data recording area.

The information for calculating the optimum recording conditions in the test recording area are recorded in a specific area of one of a plurality of recording information layers. Accordingly, even when the transmittance of the area of the first information recording layer, through which the laser light for recording information in the test recording area of the second information recording layer passes, is different from the transmittance of the area of the first recording information layer, through which the laser light for recording information in the recording and reproduction area of the second information recording layer passes, accurate recording conditions can be calculated for one of the layers as long as the recording conditions of the other layer can be obtained. As a result, a recording and reproduction apparatus for starting the optical information recording medium can immediately learn a method of calculation which is determined from the difference between the amount of light transmitted through an unrecorded state area and the amount of light transmitted through a recorded state area. Accordingly, accurate recording conditions can be obtained immediately after the optical information recording medium is mounted on the recording and reproduction apparatus.

According to this medium, one of the reproduction-only area and the recording and reproduction area of the first information recording layer includes an area through which laser light for recording information in the recording and reproduction area of the second information recording layer passes. The laser light for recording information in the recording and reproduction area of the second information recording layer has passed through the reproduction-only area or the recording and reproduction area. Accordingly, the laser light for recording information in the recording and reproduction area of the second information recording layer is not influenced by the difference between the amount of light passing through the reproduction-only area of the first information recording layer and the amount of light passing through the recording and reproduction area of the first information recording layer. As a result, accurate recording conditions can be obtained using the recording and reproduction area of the second information recording layer.

The area of the first information recording layer, through which the laser light for recording information in the recording and reproduction area of the second information recording layer passes, extends outward from an outer end of an area of the first information recording layer corresponding to the recording and reproduction area by a length δ, the length δ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the test recording area.

The area of the first information recording layer, through which the laser light for recording information in the recording and reproduction area of the second information recording layer passes, extends outward from the outer end of the area of the first information recording layer corresponding to the recording and reproduction area by a length δ', the length δ' being represented by:

$$\delta' = d \cdot \tan(\sin^{-1}(NA/n)) + \delta m$$

where δm is a maximum positional offset distance between the first information recording layer and the second information recording layer.

In an optical information recording and reproduction medium according to the present invention, the size of the reproduction-only area of the first information recording layer can be zero, such that an area influenced by the reproduction-only area of the first information recording layer is minimized at the time of recording in the recording and reproduction area of the second information recording layer. Thus, information can be recorded accurately on the second information recording layer.

Owing to this medium, the necessity of forming a phase pit in the reproduction-only area at the time of production of the first information recording layer is eliminated. Thus, the production process of the disc substrate can be simplified.

The lead-in areas or the lead-out areas of corresponding information recording layers include a first test recording area, a recording and reproduction area, and a second test recording area. Therefore, recording conditions of different information recording layers can be obtained with only the lead-in areas or the lead-out areas. In this case, the non-uniform light prevention area of the first information recording layer includes an area of the first information recording layer through which laser light for recording information in the test recording area of the second information recording layer passes.

The non-uniform light prevention area is, for example, a reproduction-only area.

The non-uniform light prevention area is, for example, an area formed of at least one of the group consisting of a reproduction-only area, a recording prohibited area, and a mirror area.

The area of the first information recording layer, through which the laser light for recording information in the test recording area of the second information recording layer passes, extends outward from an outer end of an area of the first information recording layer corresponding to the test recording area by a length $\delta$, the length $\delta$ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the test recording area.

The area of the first information recording layer, through which the laser light for recording information in the test recording area of the second information recording layer passes, extends outward from the outer end of the area of the first information recording layer corresponding to the test recording area by a length $\delta'$, the length $\delta'$ being represented by:

$$\delta' = d \cdot \tan(\sin^{-1}(NA/n)) + \delta m$$

where $\delta m$ is a maximum positional offset distance between the first information recording layer and the second information recording layer.

Accordingly, even when there is a non-negligible offset or eccentricity in the relative positions of the information recording layers, accurate recording conditions for the second information recording layer can be obtained at the time of test recording of the second information recording layer, with no influence of the difference in the amount of light passing through the first information recording layer.

According to the method of the present invention, before information is recorded in the test recording area of the second information recording layer, information is stored in an area of the first information recording layer through which laser light for recording information in the test recording area of the second information recording layer passes. Accordingly, the laser light for recording information in the test recording area of the second information recording layer is not influenced by the difference in the amount of light which is caused by the first information recording layer having both a recorded state area and an unrecorded state area. As a result, accurate recording conditions can be obtained by test recording of the second information recording layer.

The area of the first information recording layer, through which the laser light for recording information in the test recording area of the second information recording layer passes, extends outward from an outer end of an area of the first information recording layer corresponding to the test recording area by a length $\delta$, the length $\delta$ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the test recording area.

The area of the first information recording layer through which the laser light for recording information in the test recording area of the second information recording layer passes, extends outward from the outer end of the area of the first information recording layer corresponding to the test recording area by a length $\delta'$, the length $\delta'$ being represented by:

$$\delta' = d \cdot \tan(\sin^{-1}(NA/n)) + \delta m$$

where $\delta m$ is a maximum positional offset distance between the first information recording layer and the second information recording layer.

Owing to such a method, even when there is a non-negligible offset or eccentricity in the relative positions of the information recording layers, accurate recording conditions can be obtained at the time of test recording of the second information recording layer, with no influence of the difference in the amount of light caused by the first information recording layer having both a recorded state area and an unrecorded state area.

The information which is recorded in advance may be, for example, information obtained by modulating dummy information.

The information may be recorded in advance by a certification step.

According to the method of the present invention, optimum recording conditions for the second information recording layer can be calculated based on the function and/or the state of the area of the first information recording layer through which the laser light for recording information in the test recording area of the second information recording layer passes.

The area of the first information recording layer, through which the laser light for recording information in the test recording area of the second information recording layer passes, extends outward from an outer end of an area of the first information recording layer corresponding to the test recording area by a length $\delta$, the length $\delta$ being represented by:

$$\delta = d \cdot \tan(\sin^{-1}(NA/n)),$$

where d is a distance in a thickness direction between the first information recording layer and the second information recording layer; n is a refractive index of the separation layer; and NA is a numerical aperture of an objective lens for focusing the laser light to the test recording area.

The area of the first information recording layer, through which the laser light for recording information in the test recording area of the second information recording layer passes, extends outward from the outer end of the area of the first information recording layer corresponding to the test recording area by a length $\delta'$, the length $\delta'$ being represented by:

$$\delta' = d \cdot \tan(\sin^{-1}(NA/n)) + \delta m$$

where $\delta m$ is a maximum positional offset distance between the first information recording layer and the second information recording layer.

Owing to this method, even when there is a non-negligible offset or eccentricity in the relative positions of the information recording layers, accurate recording conditions can be obtained at the time of test recording of the second information recording layer, based on the difference between the amount of light transmitted through an unrecorded state area of the first information recording layer and the amount of light transmitted through a recorded state area of the first information recording layer.

It is preferable to record information for calculating the optimum recording conditions in a specific area of the optical information recording medium.

Thus, even when the method of calculation is different medium by medium, the recording and reproduction apparatus can immediately learn the method of calculation. Therefore, the time required for actually recording information after the medium is mounted on the apparatus can be shortened.

According to the optical information recording apparatus of the present invention, even when an area of the first information recording layer, through which laser light for recording information in the test recording area of the second information recording layer passes, includes an unrecorded state area, the laser light for recording information in the test recording area of the second information recording layer records the information in the area of the first information recording layer, before recording the information in the test recording area of the second information recording layer. Therefore, there is no influence of the difference in the amount of light, caused by the laser light for recording information in the test recording area of the second information recording layer passing through an area including both a recorded state area and an unrecorded state area. As a result, accurate recording conditions for the second information recording layer can be obtained.

The invention claimed is:

1. An optical information recording medium, comprising:
   a first information recording layer on which information is to be recorded by laser light; and
   a second information recording layer on which information is to be recorded by the laser light which has passed through the first information recording layer,
   wherein:
   the first information recording layer includes a first test-recording area for performing a test recording operation on the first layer, and at least one of a reproduction-only area and a recording and reproduction area,
   the second information recording layer includes a second test recording area for performing a test recording on the second layer, wherein a start location of the first test recording area is radially offset from a start location of the second test recording area, and
   at least one of the reproduction-only area and the recording and reproduction area, and the second test recording area is located such that, for all test recording performed on the second information recording layer, only one of the reproduction-only area and the recording and reproduction area includes an area of the first information recording layer through which the laser light for recording information in the second test recording area passes.

* * * * *